(12) United States Patent
Higa et al.

(10) Patent No.: US 11,443,503 B2
(45) Date of Patent: Sep. 13, 2022

(54) PRODUCT ANALYSIS SYSTEM, PRODUCT ANALYSIS METHOD, AND PRODUCT ANALYSIS PROGRAM

(71) Applicant: NEC CORPORATION, Tokyo (JP)

(72) Inventors: Kyota Higa, Tokyo (JP); Emi Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 70 days.

(21) Appl. No.: 16/977,923

(22) PCT Filed: Mar. 9, 2018

(86) PCT No.: PCT/JP2018/009205
§ 371 (c)(1),
(2) Date: Sep. 3, 2020

(87) PCT Pub. No.: WO2019/171574
PCT Pub. Date: Sep. 12, 2019

(65) Prior Publication Data
US 2020/0410275 A1 Dec. 31, 2020

(51) Int. Cl.
*G06V 10/26* (2022.01)
*G06V 10/56* (2022.01)
(Continued)

(52) U.S. Cl.
CPC ............ *G06V 10/267* (2022.01); *G06V 10/56* (2022.01); *G06V 20/52* (2022.01); *G06V 40/103* (2022.01); *G06V 40/20* (2022.01)

(58) Field of Classification Search
CPC ...... G06V 10/267; G06V 10/56; G06V 20/52; G06V 40/103; G06V 40/20
(Continued)

(56) References Cited

U.S. PATENT DOCUMENTS

| 9,911,290 B1 | 3/2018 | Zalewski et al. |
| 2012/0245969 A1* | 9/2012 | Campbell ............ G06Q 10/087 705/7.11 |

(Continued)

FOREIGN PATENT DOCUMENTS

| JP | 2008-176504 A | 7/2008 |
| JP | 2011-253344 A | 12/2011 |

(Continued)

OTHER PUBLICATIONS

Zoran Zivkovic, "Improved Adaptive Gaussian Mixture Model for Background Subtraction", Proceedings of the 17th International Conference on Pattern Recognition (ICPR'04), U.S. IEEE Computer Society, Aug. 2004, pp. 28-31, vol. 2-vol. 02.

(Continued)

*Primary Examiner* — Kenny A Cese
(74) *Attorney, Agent, or Firm* — Sughrue Mion, PLLC

(57) ABSTRACT

A product analysis system 800 includes a detection means 810, a classification means 820, and a specification means 830. The detection means 810 detects an area of change in a product shelf from a video of the product shelf. The classification means 820 classifies the change in the product shelf in the detected area of change. The specification means 830 specifies the frequency at which a customer was interested in but did not purchase a product on the basis of the classification of the change.

8 Claims, 25 Drawing Sheets

(51) Int. Cl.
*G06V 20/52* (2022.01)
*G06V 40/20* (2022.01)
*G06V 40/10* (2022.01)

(58) Field of Classification Search
USPC .......................................................... 382/164
See application file for complete search history.

(56) References Cited

U.S. PATENT DOCUMENTS

2014/0279294 A1* 9/2014 Field-Darragh ... G06Q 30/0282
705/28
2017/0206571 A1* 7/2017 Dhawan ............. G06Q 30/0613
2017/0344935 A1* 11/2017 Mattingly ............ G06Q 10/087

FOREIGN PATENT DOCUMENTS

| JP | 2014-021795 A | 2/2014 |
| WO | 2015/033577 A1 | 3/2015 |
| WO | 2015/040661 A1 | 3/2015 |
| WO | 2017/163909 A1 | 9/2017 |

OTHER PUBLICATIONS

International Search Report of PCT/JP2018/009205 dated May 22, 2018 [PCT/ISA/210].
Japanese Office Communication for JP Application No. 2020-504619 dated May 10, 2022 with English Translation.

* cited by examiner

G1  G2

G3  141

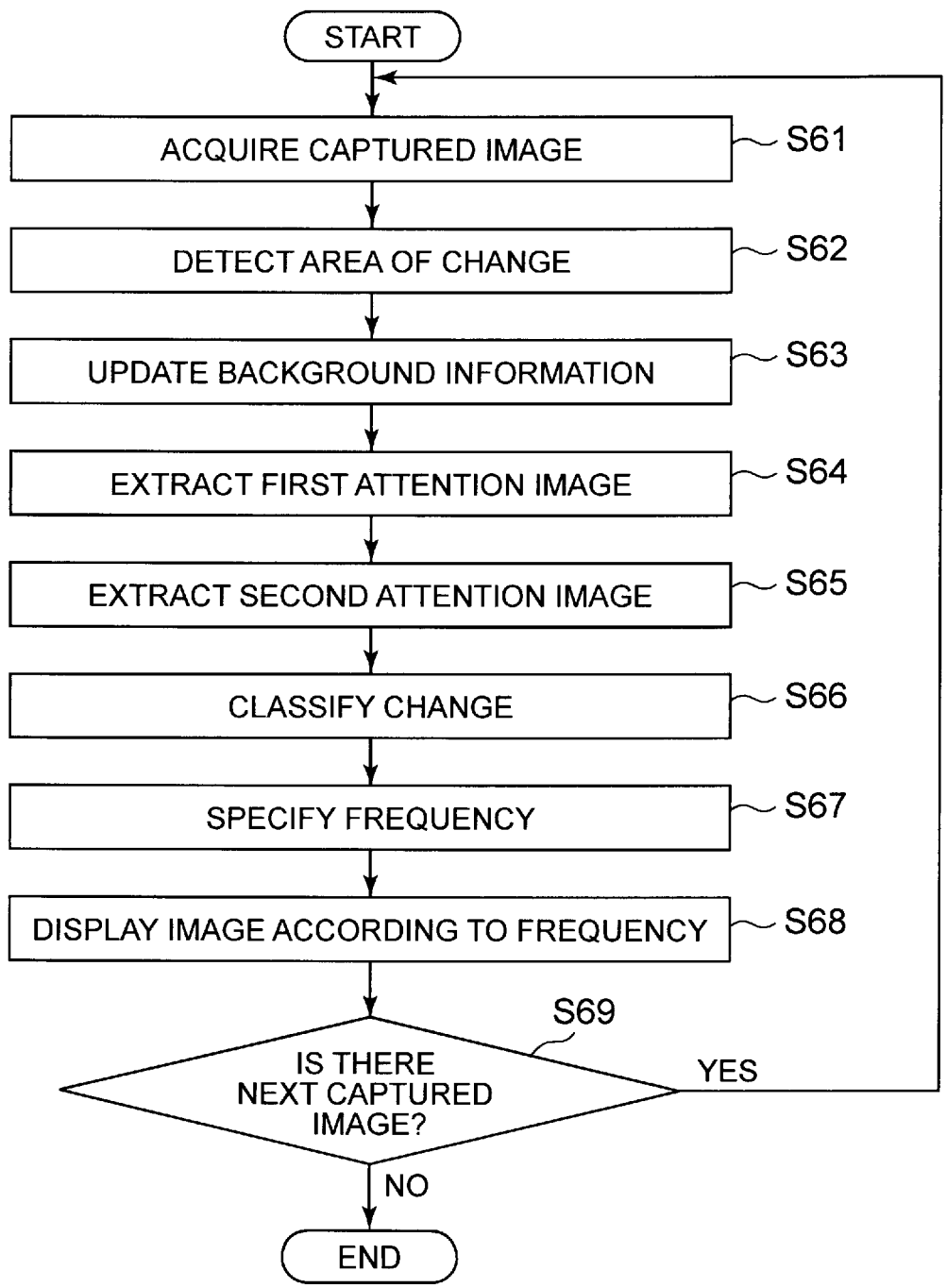

FIG. 13

| SECOND ATTENTION IMAGE (71) | FIRST ATTENTION IMAGE (72) | TYPE OF CHANGE (73) | CHANGE AREA INFORMATION (74) | BINARY IMAGE IDENTIFIER (75) | PRODUCT SHELF INFORMATION (76) |
|---|---|---|---|---|---|
| ▭ | ▭ | CHANGE CAUSED BY PRODUCT CONTAINED ANEW IN PRODUCT SHELF | (x1,y1),(x2,y2),(x3,y3),(x4,y4) | IDa1 | xx |
| ▦ | ▭ | CHANGE CAUSED BY THAT PRODUCT IS NO LONGER CONTAINED IN PRODUCT SHELF | (x5,y5),(x6,y5),(x6,y6),(x5,y6) | IDa1 | xx |
| ▭ | ▦ | CHANGE CAUSED BY DIFFERENT APPEARANCE OF PRODUCT DISPLAYED ON PRODUCT SHELF | (x7,y7),(x8,y8),(x9,y9),(x10,y10) | IDa1 | xx |

70

PRODUCT ANALYSIS SYSTEM, PRODUCT ANALYSIS METHOD, AND PRODUCT ANALYSIS PROGRAM

CROSS REFERENCE TO RELATED APPLICATIONS

This application is a National Stage of International Application No. PCT/JP2018/009205, filed Mar. 9, 2018.

TECHNICAL FIELD

The present invention relates to a product analysis system, a product analysis method, and a product analysis program for analyzing products that customers are interested in.

BACKGROUND ART

At stores that sell products such as convenience stores and supermarkets, it is important to know the products that customers are interested in. In addition, if the display positions of the products that customers are interested in can be known as well as those products, it may lead to an increase in product sales.

A product that a customer actually purchased can be known as a product that the customer is interested in. On the other hand, if the customer does not buy a product even if the customer shows interest in the product, it is difficult to know the product. Therefore, there have been proposed various methods of knowing the interests of customers by understanding the trends of customers for product shelves where products are placed.

For example, Patent Literature (PTL) 1 describes a method of evaluating a store layout. In the method described in PTL 1, an image of a product shelf installed in a store is acquired, and then the statistics of visitors' behaviors in the vicinity of the product shelf acquired by using sensors or images are displayed in a graphic form or the like.

Further, PTL 2 and Non Patent Literature (NPL) 1 describe a background subtraction method for detecting a foreground area on the basis of background information of a captured image.

CITATION LIST

Patent Literatures

PTL 1: WO 2015/040661
PTL 2: Japanese Patent Application Laid-Open No. 2008-176504

Non Patent Literature

NPL 1: Zoran Zivkovic, "Improved Adaptive Gaussian Mixture Model for Background Subtraction," Proceedings of the 17th International Conference on Pattern Recognition (ICPR'04), U.S. IEEE Computer Society, August 2004, Volume 2-Volume 02, pp. 28-31

SUMMARY OF INVENTION

Technical Problem

In the method described in PTL 1, a hand-reaching frequency is calculated by using a sensor for detecting the holding of a product with a shoplifting prevention tag or a human sensor for sensing hand reaching (act of reaching for a displayed product) and for a visitor's approach. When focusing on a customer's behavior, however, an act of reaching for a product shelf includes not only an act of picking up a product from the product shelf but also an act of returning the product to the product shelf. Therefore, when using the method described in PTL 1, it is difficult to know this type of differences.

In addition, the method described in PTL 1 has a problem of requiring the introduction of equipment or tags for knowing the customers' behaviors, which increases the cost.

Therefore, it is an object of the present invention to provide a product analysis system, a product analysis method, and a product analysis program capable of analyzing products that customers are interested in, even for products that the customers did not purchase.

Solution to Problem

According to an aspect of the present invention, there is provided a product analysis system including: a detection means for detecting an area of change in a product shelf from a video of the product shelf a classification means for classifying the change in the product shelf in the detected area of change; and a specification means for specifying a frequency at which a customer was interested in but did not purchase a product on the basis of the classification of the change.

According to another aspect of the present invention, there is provided a product analysis method including the steps of: detecting an area of change in a product shelf from a video of the product shelf classifying the change in the product shelf in the detected area of change; and specifying a frequency at which a customer was interested in but did not purchase a product on the basis of the classification of the change.

According to still another aspect of the present invention, there is provided a product analysis program causing a computer to perform: a detection process for detecting an area of change in a product shelf from a video of the product shelf a classification process for classifying the change in the product shelf in the detected area of change; and a specification process for specifying a frequency at which a customer was interested in but did not purchase a product on the basis of the classification of the change.

Advantageous Effects of Invention

The present invention enables analysis of products that customers are interested in even in the case of products that the customers did not purchase.

BRIEF DESCRIPTION OF DRAWINGS

FIG. 12 It depicts a flowchart illustrating an example of operation of the image processing device 100 in a first example.

FIG. 13 It depicts an explanatory diagram illustrating an example of a classification result.

DESCRIPTION OF EMBODIMENT

Hereinafter, exemplary embodiments of the present invention will be described with reference to appended drawings.

Exemplary Embodiment 1

Figure 1:
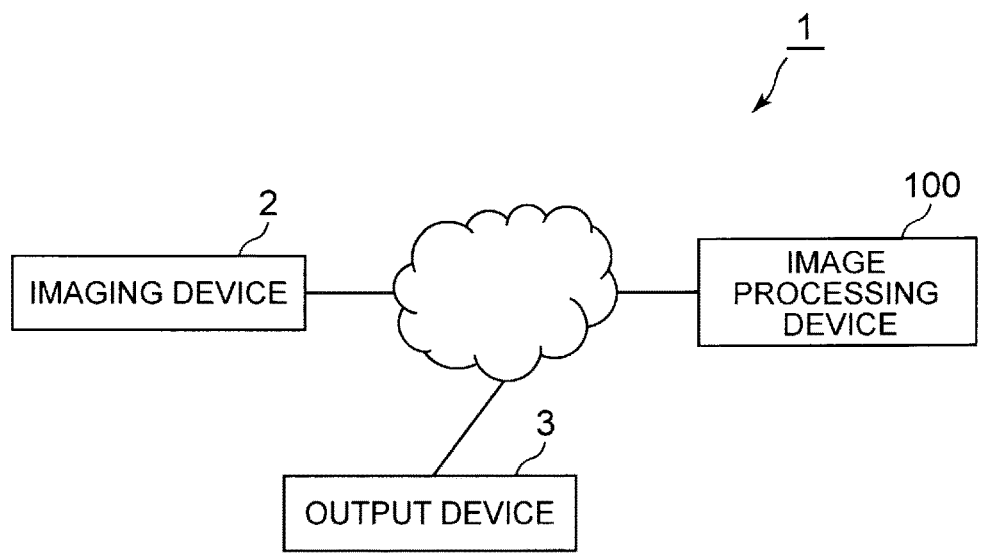
FIG. 1 It depicts a block diagram illustrating a configuration example of a first exemplary embodiment of a product analysis system.

FIG. 1 is a block diagram illustrating a configuration example of a first exemplary embodiment of a product analysis system according to the present invention. The product analysis system 1 of this exemplary embodiment includes an image processing device 100, an imaging device 2, and an output device 3. The image processing device 100 is communicatively connected to the imaging device 2 and to the output device 3.

In this exemplary embodiment, description will be made assuming that the image processing device 100 is configured to be separate from the imaging device 2 and from the output device 3. The image processing device 100, however, may be built in the imaging device 2 or may be built in the output device 3. Moreover, there may be a plurality of imaging devices 2. Further, the video captured by the imaging device 2 may be a moving image or may be composed of continuous still images.

The output device 3 may be, for example, a display device such as a display, or may be a POS (point of sales) terminal. Further, the output device 3 is not limited thereto, and may be a speaker or a mobile terminal.

Figure 2:
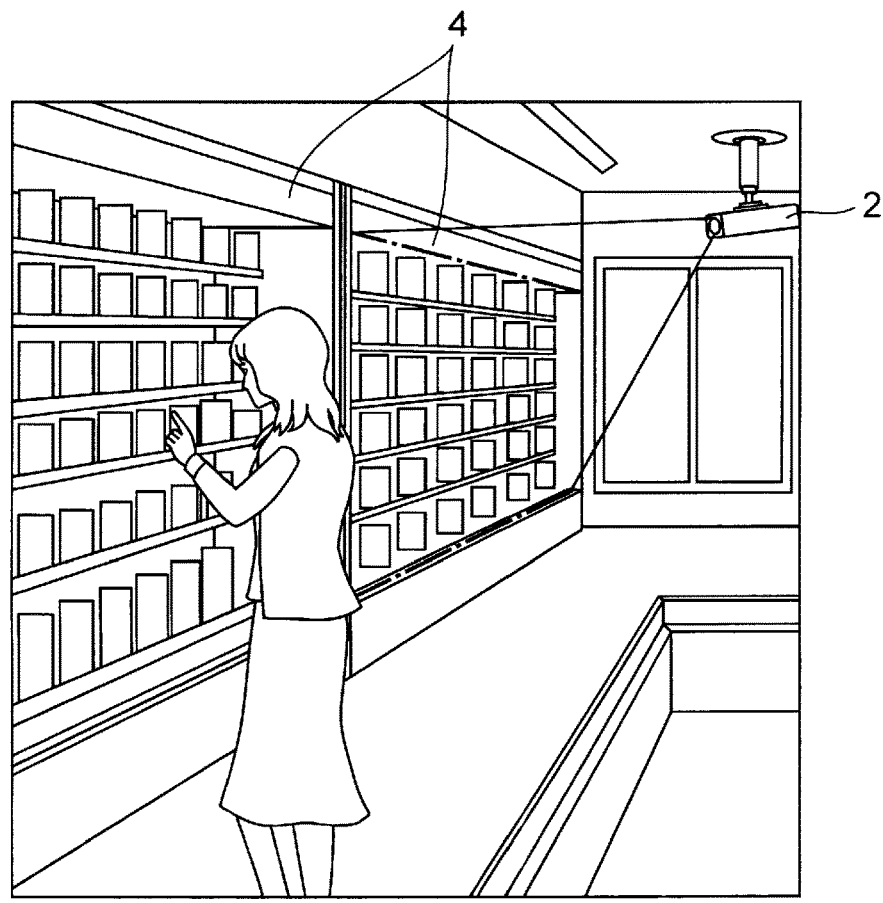
FIG. 2 It depicts an explanatory diagram illustrating an example of a use scene of a product analysis system 1.

FIG. 2 is an explanatory diagram illustrating an example of a use scene of the product analysis system 1. Referring to FIG. 2, in the product analysis system 1, the imaging device 2 captures an image of the product shelf 4 in the store. Then, the imaging device 2 sends a video signal indicating the captured image captured by the imaging device 2 to the image processing device 100.

The imaging device 2 is, for example, a security camera installed in a store or the like. The imaging device 2 is installed, for example, at a predetermined position where the product shelf 4 can be imaged in a store or the like. In addition, a camera ID or the like for identifying the imaging device 2 is assigned in advance to the imaging device 2. The imaging device 2 acquires a captured image. At this time, the imaging device 2 refers to, for example, its own clock or the like and associates the imaging time, which is the time when the captured image was acquired, with the acquired captured image. In this way, the imaging device 2 acquires the captured image representing the state of the product shelf 4 and the like.

The video captured by the imaging device 2 may be a moving image or be composed of continuous still images. Further, in this exemplary embodiment, the captured image acquired by the imaging device 2 is at least one of a color image (hereinafter, referred to as "RGB [red green blue] image") and a range image. The captured image acquired by the imaging device 2 may be, for example, an image in a color space other than the RGB image color space.

As described above, the imaging device 2 sends the video signal indicating the acquired captured image to the image processing device 100. The imaging device 2 may store the captured image in the inside of the imaging device 2 or in a storage device different from the image processing device 100.

Figure 3:
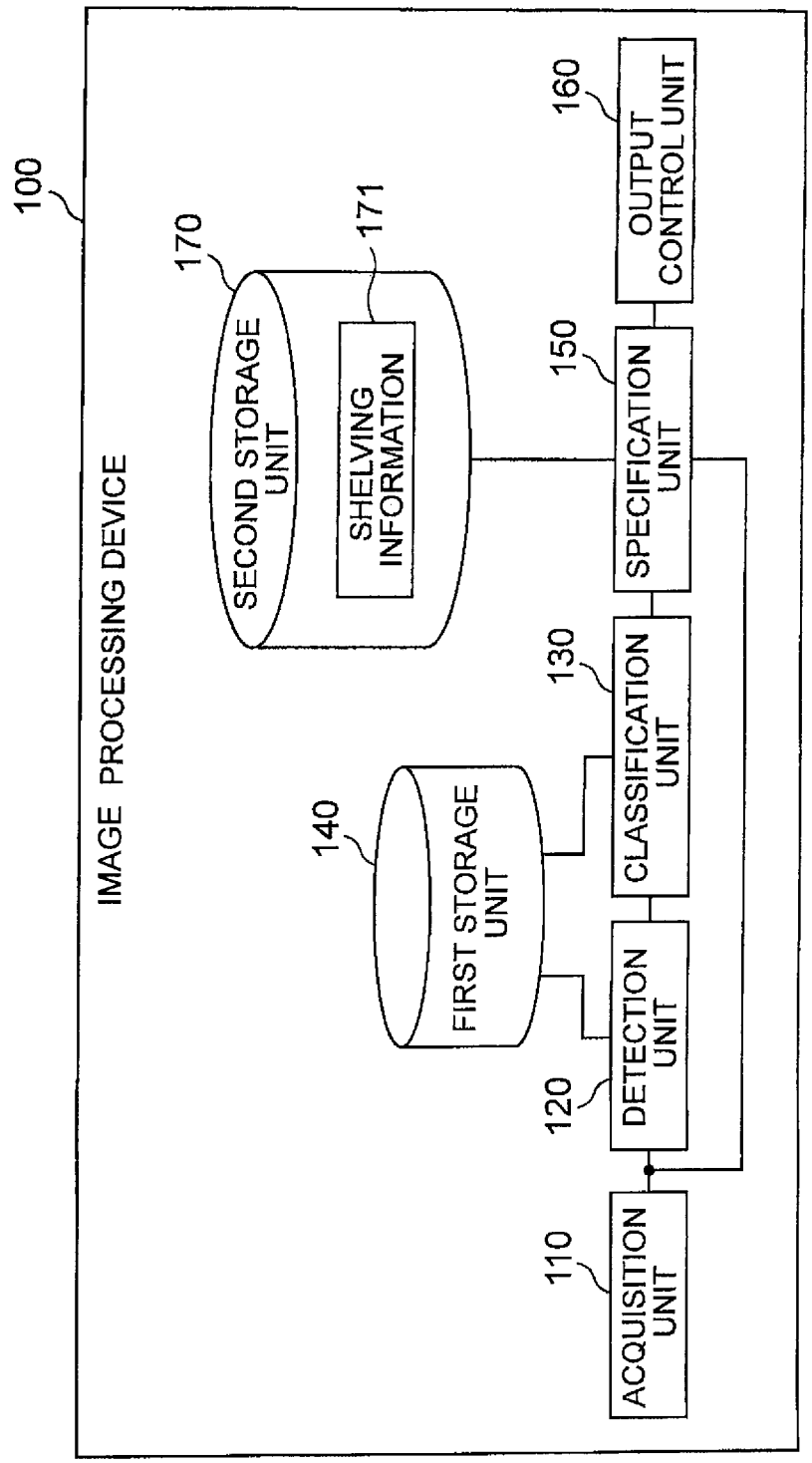
FIG. 3 It depicts a block diagram illustrating a configuration example of an image processing device 100.

FIG. 3 is an explanatory diagram illustrating a configuration example of the image processing device 100. The image processing device 100 of this exemplary embodiment includes an acquisition unit 110, a detection unit 120, a classification unit 130, a first storage unit 140, a specification unit 150, an output control unit 160, and a second storage unit 170. Specifically, the image processing device 100 includes, for example, an arithmetic device and a storage device (not illustrated). Then, the image processing device 100 implements the above respective processing units, for example, by executing programs stored in the storage device with the arithmetic device. Note that the image processing device 100 in FIG. 3 is illustrated as a configuration unique to the present disclosure. The image processing device 100 may include other members not illustrated in FIG. 3. This point is the same for the second and subsequent exemplary embodiments.

The acquisition unit 110 acquires a video signal indicating the captured image acquired by the imaging device 2 that images the product shelf 4. The acquisition unit 110 may receive the video signal sent from the imaging device 2. The acquisition unit 110 may acquire a video signal converted on the basis of the captured image stored in the inside of the imaging device 2 or in a storage device different from the imaging device 2 and from the image processing device 100. In the case where the image processing device 100 is built in the imaging device 2, the acquisition unit 110 may be configured to acquire the captured image itself.

The acquisition unit 110 converts the acquired video signal to at least one or both of the RGB image and the range image that constitute the video signal. Then, the acquisition unit 110 supplies the converted image (at least one or both of the RGB image and the range image) to the detection unit 120 and to the classification unit 130. Note that the RGB image and range image, which have been acquired by the acquisition unit 110 by converting the video signal, represent captured images of the product shelf 4 captured by the imaging device 2 and therefore are also simply referred to as "captured images."

The first storage unit 140 stores data used when the detection unit 120 and the classification unit 130 perform the respective processes. The data stored by the first storage unit 140 will be described with reference to different drawings.

The detection unit 120 detects the area of change related to the product shelf 4. For example, if a product displayed on the product shelf 4 included in the captured image is not included in an image (for example, the background image) acquired earlier than the captured image, the detection unit 120 detects the area of this product. Further, for example, if a product displayed on the product shelf 4 included in the background image is not included in the captured image, the detection unit 120 detects the area of this product. If a product displayed on the product shelf 4 included in the captured image is different in appearance from the product included in the background image, the detection unit 120 detects the area of this product.

In the case where the captured image is captured when a person or an object is present between the product shelf 4 and the imaging device 2, the detection unit 120 detects the area of the person or object included in the captured image of the product shelf 4. In this manner, the detection unit 120 detects the area of change related to the product shelf 4, such as the area of change inside the product shelf 4, the area of change in the captured image caused by an object between the product shelf 4 and the imaging device 2, or the like.

The detection unit 120 may generate, for example, a binary image of the same size as the captured image, in which the pixel value of the detected area of change is represented by 255 and the pixel value of other areas is represented by 0. The detection unit 120 supplies the generated binary image to the classification unit 130 as a result of the detection of the area of change. At this time, the detection unit 120 may add information indicating the captured image used to generate the binary image to the binary image before supplying the binary image to the classification unit 130 or may supply the captured image to the classification unit 130 together with the binary image.

Note that the detection result only needs to include information indicating the detected area of change. The detection unit 120 may associate, for example, information indicating the position of the detected area of change (area with a pixel value of 255) and its size with information indicating the captured image used to detect the area of change and with information indicating the background image before outputting them as the detection result. In this manner, the detection result output by the detection unit 120 may have any format. The internal structure of the detection unit 120 will be described with reference to different drawings.

The classification unit 130 classifies a change related to the product shelf 4 in the area of change. The classification unit 130 classifies a change in the state of the image of the area corresponding to the detected area of change, on the basis of the detection result (binary image) supplied from the detection unit 120 and of the model of the change related to the product shelf 4 learned in advance or distance information indicating the image captured before the imaging time of the captured image.

The state of the image means, for example, a state where a product is included or not included in the image, a state where a customer is included or not included in the image, a state where a shopping basket is included or not included in the image, a state where a shopping cart is included or not included in the image, or the like. The classification unit 130 classifies the changes related to the product shelf 4 in the area of change, for example, into "a change caused by that a product is no longer contained in the product shelf 4," "a change caused by that a product is contained anew in the product shelf 4," and "a change caused by a different appearance of a product displayed on the product shelf 4." In addition, the classification unit 130 may classify the changes into "a change caused by the presence of a person in front of the product shelf 4," "a change caused by the presence of a shopping cart in front of the product shelf 4," "a change caused by a change in illumination," and other types of change.

In addition, since "a change caused by that a product is no longer contained in the product shelf 4" indicates that the customer picked up the product, it can be said to be "a change caused by taking a product from the product shelf." Furthermore, since "a change caused by that a product is contained anew in the product shelf 4" indicates that the customer returned the product, it can be said to be "a change caused by arranging (placing) a product on the product shelf." In addition, "a change caused by a different appearance of a product displayed on the product shelf 4" indicates that a customer returned the product picked up by the customer and thereby the place of the product deviated from its original position. Therefore, it can be said to be "a change caused by shifting the position of a product that has been placed on the product shelf."

As described above, the classification unit 130 may classify the change in the product shelf as any one of the types, "a change caused by taking a product from the product shelf," "a change caused by placing a product on the product shelf," and "a change caused by shifting the position of a product that has been placed on the product shelf," The type of "a change caused by taking a product from the product shelf" indicates that the customer purchased the product (with interest). On the other hand, it can be said that "a change caused by placing a product on the product shelf" or "a change caused by shifting the position of a product that has been placed on the product shelf" indicates that there is a product that a customer was interested in but did not purchase.

The types into which the classification unit 130 classifies the changes in the state of the area of change are merely illustrative and not limited thereto. Moreover, for example, "a change caused by a different appearance of a product displayed on the product shelf 4" may be classified in more detail such as, for example, as "a change in appearance caused by a different product" or "a change in appearance caused by a change in product attitude." The internal configuration of the classification unit 130 will be described with reference to different drawings.

The classification unit 130 supplies the classification result described above to the specification unit 150. The classification result includes information indicating the type of change in the area of change, information representing a rectangle circumscribing the area of change (referred to as "change area information") on the captured image acquired by the acquisition unit 110, a binary image, which is the detection result of the area of change output by the detection unit 120, and information on the product shelf 4 included in the captured image.

The change area information may be composed of, for example, the x-coordinate values and the y-coordinate values of the four corners of the rectangle circumscribing the attention area, or may be composed of the x-coordinate value and the y-coordinate value of at least one of the four corners of the circumscribing rectangle and the width and height of the circumscribing rectangle. The change area information is not limited to the information that represents a rectangle, but may be information that represents other shapes or information that represents a frame that surrounds the area of change.

The information on the product shelf 4 included in the captured image may be information indicating the position where the captured image was captured, information indicating the position of the product shelf 4, or an identifier by which the product shelf 4 can be identified.

The second storage unit 170 stores shelving information 171. The second storage unit 170 may be implemented by a storage device different from the image processing device 100 or may be built in the specification unit 150. Moreover, the second storage unit 170 may be implemented integrally with the first storage unit 140.

The shelving information 171 is information indicating the positions where the products prepared in advance are arranged on the product shelf of each store. The shelving information is, for example, information in which a product shelf number (row) and a column number are linked with the name of each product placed at the position of the numbers. Further, the position where the imaging device 2 captures an image is previously linked with the position of the product shelf for management. Therefore, the product is able to be specified by linking the product shelf area of the image captured by the imaging device 2 with the shelving information.

Figure 4:
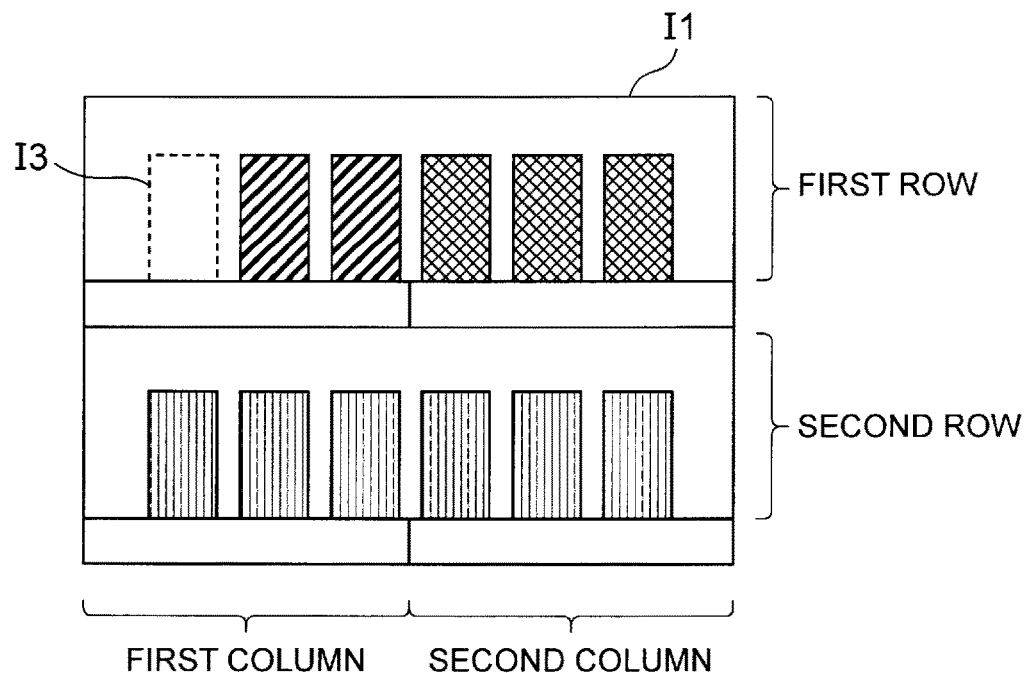
FIG. 4 It depicts an explanatory diagram illustrating an example of shelving information.

FIG. 4 is an explanatory diagram illustrating an example of the shelving information. In the example illustrated in FIG. 4, it is assumed that an image I1 is captured by a camera with the camera ID of 1, which is an imaging device. Shelving information I2 illustrated in FIG. 4 represents products arranged in the range specified by a row and a column of the product shelf. For example, it is assumed that the position information of a product I3 included in the image I1 matches position information represented by four corners of the circumscribing rectangle (for example, position information (10, 0, 30, 50)). In this case, the product I3 is specified as a product "a" linked with the first column of the first row of the shelving information I2.

The specification unit 150 specifies the frequency at which the customer was interested in a product, on the basis of the change in the product shelf 4 classified by the classification unit 130. In this exemplary embodiment, the specification unit 150 specifies, in particular, the frequency at which the customer was interested in but did not purchase the product. The specification unit 150 may specify the frequency at which the customer purchased the product.

For example, it is assumed that the classification unit 130 classified the change in the product shelf as one of "a change caused by taking a product from the product shelf," "a change caused by placing a product on the product shelf," and "a change caused by shifting the position of a product that has been placed on the product shelf." In this case, the specification unit 150 may treat a product to be subject to "a change caused by taking a product from the product shelf" as a target classified as a product purchased by the customer (with interest), as described above. Moreover, the specification unit 150 may treat the product to be subject to "a change caused by placing a product on the product shelf" or "a change caused by shifting the position of a product that has been placed on the product shelf" as a target classified as a product that the customer was interested in but did not purchase.

In addition, the target for specifying the product frequency may be an individual product or may be a product in the detected area of change. Furthermore, the aggregate calculation unit is arbitrary. The aggregate calculation unit may be not only an individual product, but also a shelf on which the product is placed or may be the type (classification) of the product.

If the target for specifying the frequency is an individual product, the specification unit 150 may add up the frequency for each product included in the changed area. Moreover, if the target for specifying the frequency is a product of the detected area of change, the specification unit 150 may add up the frequency for each changed area. In the case of adding up the frequency for each area, the specification unit 150 does not need to specify individual products. The specification unit 150 may specify, for each classification of change, a value obtained by weighting the area of change according to the number of times that the change was detected as the area of change, as a frequency related to the product included in the area of change.

Figure 5:
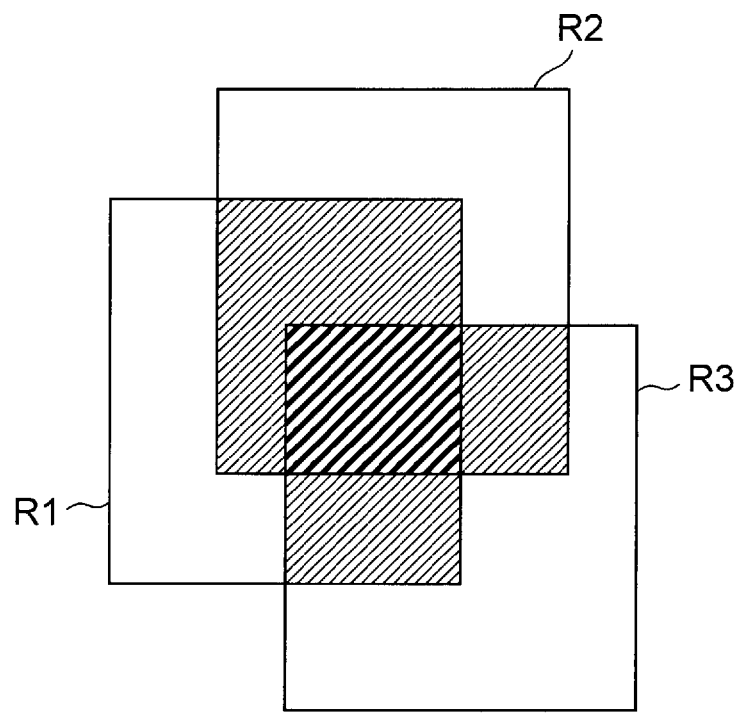
FIG. 5 It depicts an explanatory diagram illustrating an example of weighted areas of change.

FIG. 5 is an explanatory diagram illustrating an example of weighted areas of change. It is assumed that three areas of change R1 to R3 are detected as illustrated in FIG. 5 and that all of the changes are classified as "a change caused by shifting the position of a product that has been placed on the product shelf." In this situation, the specification unit 150 may use, for example, a weight of 3 on the area overlapping in all of the areas of change R1 to R3, a weight of 2 on the area overlapping in two areas of change among the areas of change R1 to R3, and a weight of 1 on the area not overlapping with any area in the areas of change R1 to R3. Then, the specification unit 150 may specify the weight corresponding to the area of change as the frequency at which the customer was interested in but did not purchase the product.

While the specification unit 150 calculated the number of overlapping areas of change as a weight in the example illustrated in FIG. 5, the weight may be determined so as to monotonically increase according to the number of overlapping areas of change. In addition, although the specification unit 150 performed weighting for the entire area of change in the example illustrated in FIG. 5, the weighting may be performed for a predetermined range from the center of the area of change.

The specification unit 150 specifies the target product that has changed in the product shelf, on the basis of the classification of the change in the product shelf and on the basis of the shelving information 171 on the product shelf. In this exemplary embodiment, the specification unit 150 particularly specifies the product that the customer was interested in but did not purchase, on the basis of the classification of the change in the product shelf and on the basis of the shelving information on the product shelf. In the case where the classification of the change in the product shelf is "a change caused by placing a product on the product shelf" or "a change caused by shifting the position of a product that has been placed on the product shelf," the specification unit 150 specifies the product that has changed in the product shelf as the product that a customer was interested in but did not purchase, on the basis of the shelving information.

The output control unit 160 receives a result of specifying the frequency from the specification unit 150. Then, the output control unit 160 sends a control signal for controlling the output device 3 to output the frequency at which the customer was interested in the product in a recognizable form. In the following description, to simplify the description, the process in which the output control unit 160 controls the output device 3 to perform control is simply described as "the output control unit 160 performs output." Moreover, the screens illustrated below are displayed on the output device 3 according to an instruction of the output control unit 160, and therefore the output control unit 160 can be referred to as "display means."

The output control unit 160 of this exemplary embodiment displays a video of the product shelf. At that time, the output control unit 160 displays an image according to the frequency at which the customer was interested in but did not purchase the product with the image so as to be associated with the corresponding area in the video. Note that the method of displaying the image according to the frequency so as to be associated with the corresponding area includes displaying the image so as to be superimposed on a target indicated by the frequency and displaying the image in another area along with information indicating the area.

In addition, the image according to the frequency includes, for example, an image representing the value of the frequency itself, a heat map expressed according to the frequency, and the like. For example, in the case of a product in the area of change in which a target with a specified frequency is detected, the output control unit 160 may display an image in a form according to the frequency (for example, weight) at which the customer was interested in but did not purchase the product so as to be superimposed on the area of change like a heat map for the video of the product shelf.

Figure 6:
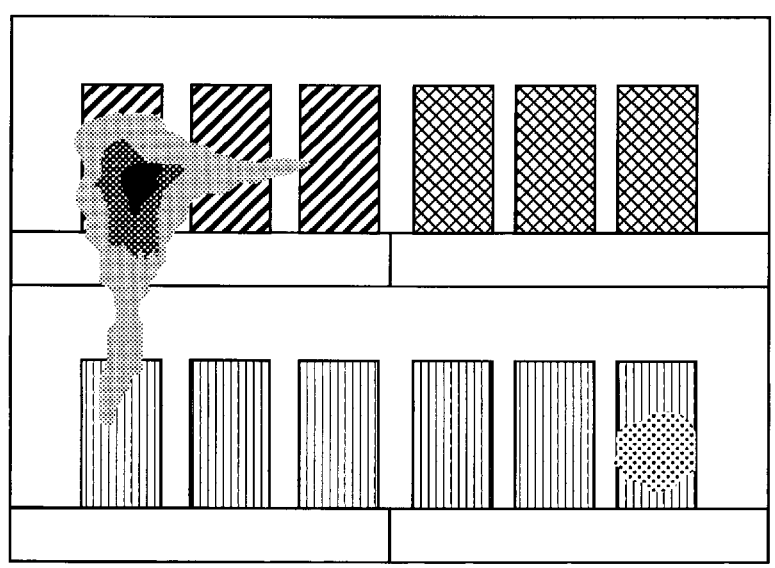
FIG. 6 It depicts an explanatory diagram illustrating an example of a heat map display according to frequencies.

FIG. 6 is an explanatory diagram illustrating an example of a heat map display according to the frequencies at which customers are interested in but did not purchase the products. In the example illustrated in FIG. 6, the heat map is mainly superimposed and displayed on the area in the upper left of the product shelf, thereby enabling the customers' high interest in the products present in this area to be known.

In addition, for example, in the case where the target with the frequency specified is an individual product, the output control unit 160 may display the frequency at which the customer was interested in but did not purchase the product in another area along with the shelf number and the product name together with the video of the product shelf.

Figure 7:
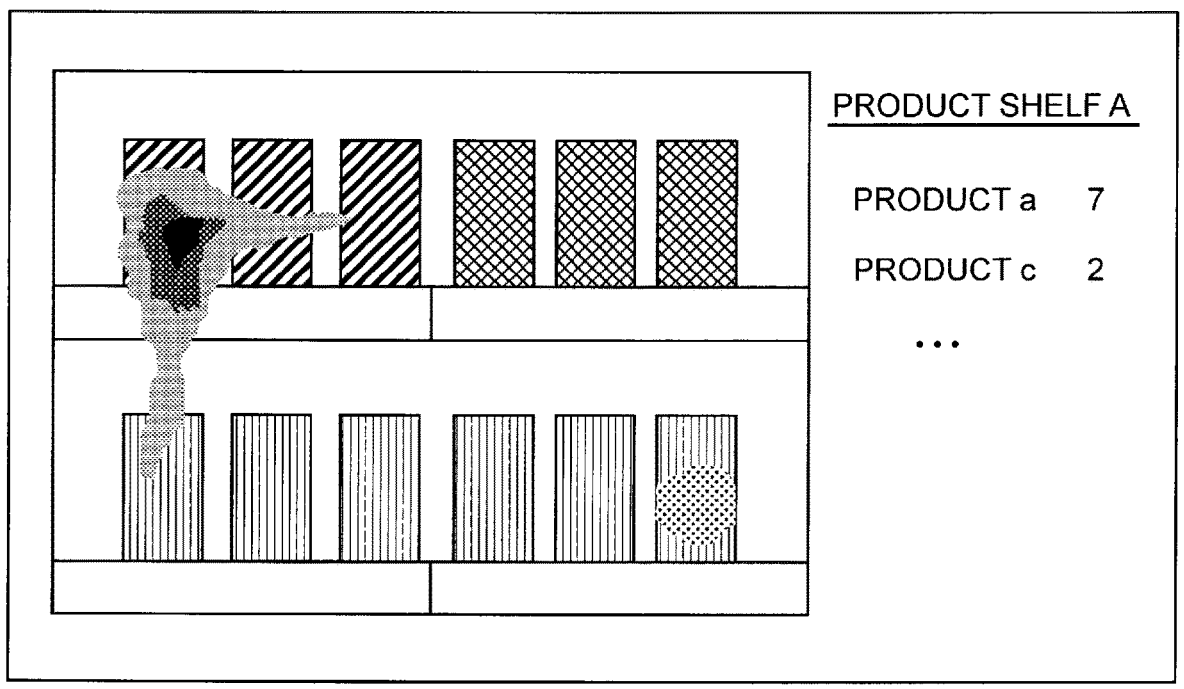
FIG. 7 It depicts an explanatory diagram illustrating an example of displaying the frequencies in another area.

FIG. 7 is an explanatory diagram illustrating an example of displaying the frequencies at which customers were interested in but did not purchase the products in another area. For example, it is assumed that the product in the upper right of the product shelf illustrated in FIG. 6 is specified as "product a" on the basis of the shelving information. In this case, the output control unit 160 may display information in which the name of a product ("product a") that the customer was interested in but did not purchase is linked with the frequency thereof (for example, weight) in an area different from the video area. In the example illustrated in FIG. 7, the output control unit 160 displays the video of the product shelf on the left side with the frequency and the product name displayed on the right side.

Moreover, the output control unit 160 may display not only the frequency at which the customer was interested in but did not purchase the product, but also the value indicating the relationship with the frequency at which the customer purchased the product (with interest). The output control unit 160 may calculate, for example, a first score so as to be low for a product with a high frequency at which the product was purchased, while calculating the first score so as to be high for a product with a high frequency at which a customer was interested in but did not purchase the product. Then, the output control unit 160 may display an image of a color according to the score (for example, red for a low score, blue for a high score) with the image superimposed on the video of the product shelf.

In addition, the output control unit 160 may calculate a second score on the basis of the frequency at which the product was purchased and the frequency at which a customer was interested in but did not purchase the product. The output control unit 160 may calculate, for example, the frequency at which a customer was interested in but did not purchased the product, as the second score, relative to the value obtained by adding the frequency at which the product was purchased to the frequency at which the customer was interested in but did not purchased the product. Moreover, the output control unit 160 may use the aggregate calculation unit not only for individual products, but also for a column of the product shelf or for a product category.

In addition, the output control unit 160 may display the frequency at which a customer purchased the product and the frequency at which the customer was interested in but did not purchase the product so as to be superimposed on each other in a distinguishable manner. The output control unit 160 may display, for example, the frequency at which the customer was interested in but did not purchase the product in a heat map and display the frequency at which the customer purchased the product by using a numerical value or a shading degree.

Moreover, considering that there is a plurality of product shelves in a store, the output control unit 160 may display a store map in which the store layout is overviewed in the initial state to prompt a customer to select a target product shelf.

Figure 8:
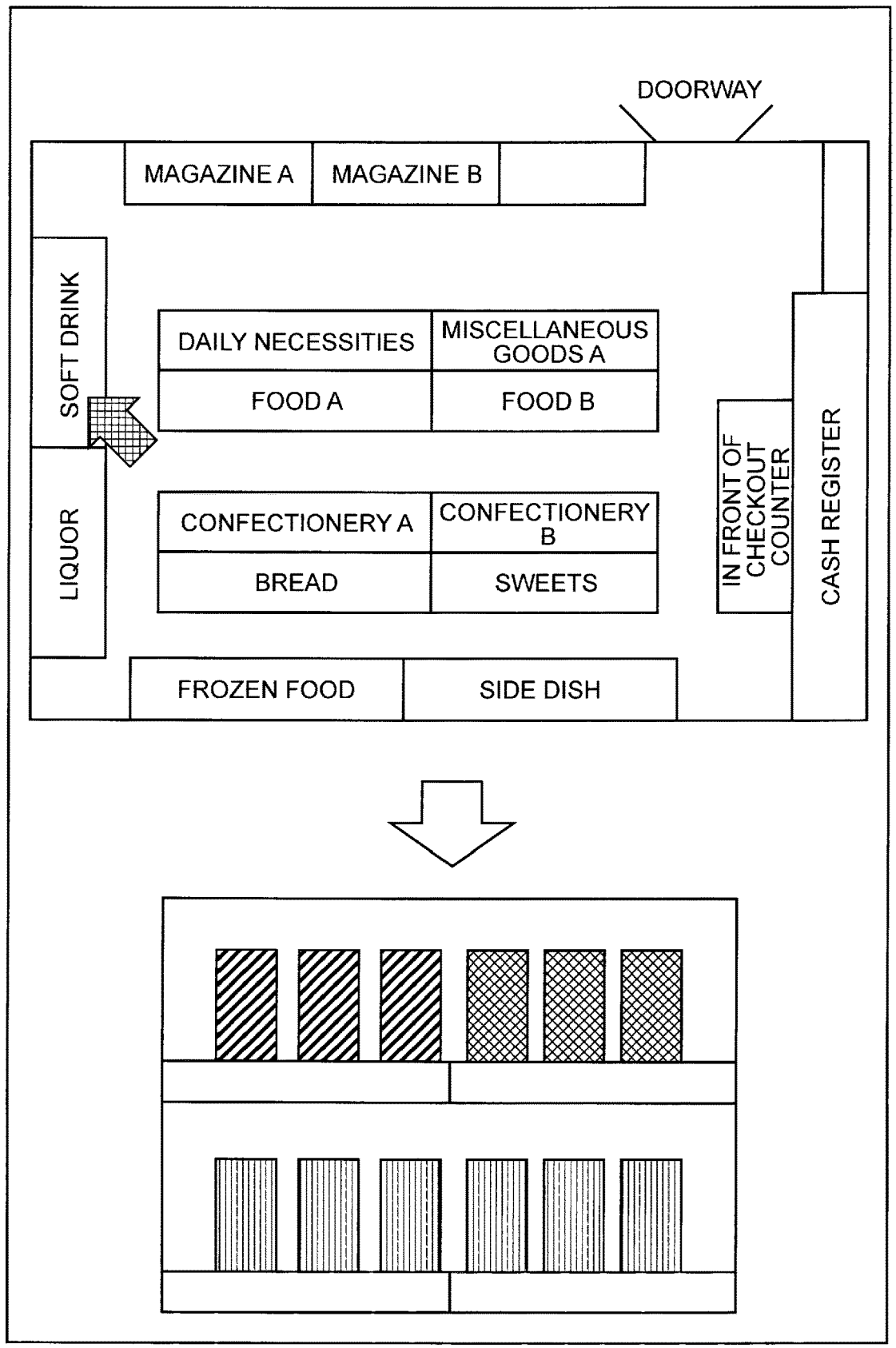
FIG. 8 It depicts an explanatory diagram illustrating an example of displaying a product shelf from a store map.

FIG. 8 is an explanatory diagram illustrating an example of displaying a product shelf from the store map. In the example illustrated in FIG. 8, first, the output control unit 160 displays the store map (see upper part of FIG. 8) and accepts a designation of a product shelf from a user. The output control unit 160 displays the designated product shelf and superimposes the frequency at which the user was interested in but did not purchase the product on the display (see lower part of FIG. 8)

In addition, the output control unit 160 may prompt a user to select the target product shelf from the product classification, instead of from the store map.

Figure 9:
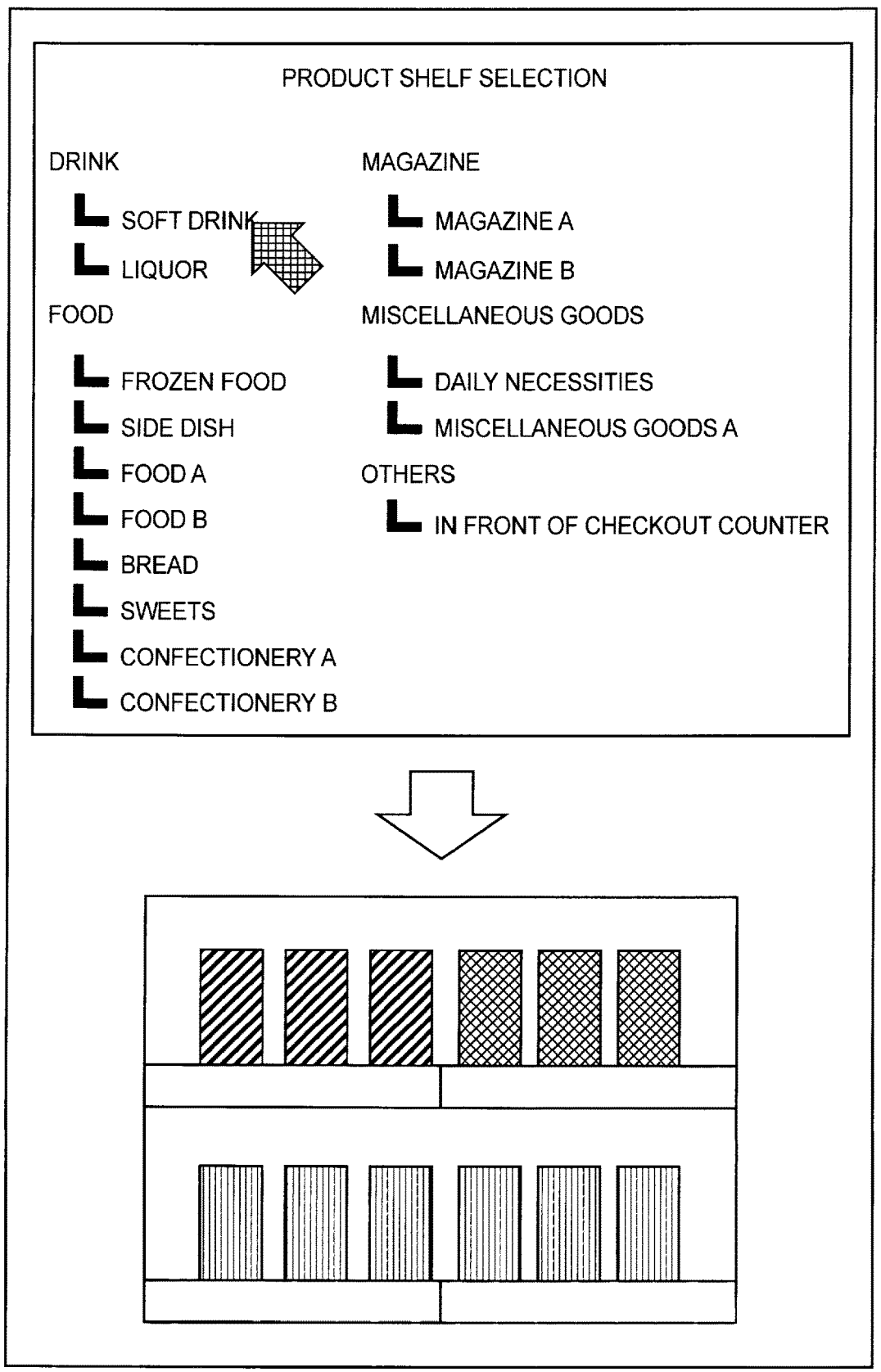
FIG. 9 It depicts an explanatory diagram illustrating an example of displaying a product shelf from a list of product categories.

FIG. 9 is an explanatory diagram illustrating an example of displaying a product shelf from a list of product categories. In the example illustrated in FIG. 9, first, the output control unit 160 displays a list of product categories (see Fig. upper part of FIG. 9). Upon the designation of a product category from the list, the output control unit 160 displays a product shelf where applicable products are present and also superimposes the frequencies at which customers were interested in but did not purchase the products on the display (see Fig. lower part of FIG. 9). Moreover, the output control unit 160 may display the list of product categories hierarchically as illustrated in FIG. 9.

In this manner, the output control unit 160 displays the image in the form according to the frequency at which a customer was interested in but did not purchase the product so as to be superimposed on the area of change for the video of the product shelf, thereby facilitating redesigning of the shelving, such as placing products with higher frequencies in front of a register or the like.

Subsequently, description will be made on the configuration example of the acquisition unit 110, the detection unit 120, the classification unit 130, and the first storage unit 140. Hereinafter, the device including the acquisition unit 110, the detection unit 120, the classification unit 130, and the first storage unit 140 is referred to as "classification device 10."

(First Example of Classification Device 10)

Figure 10:
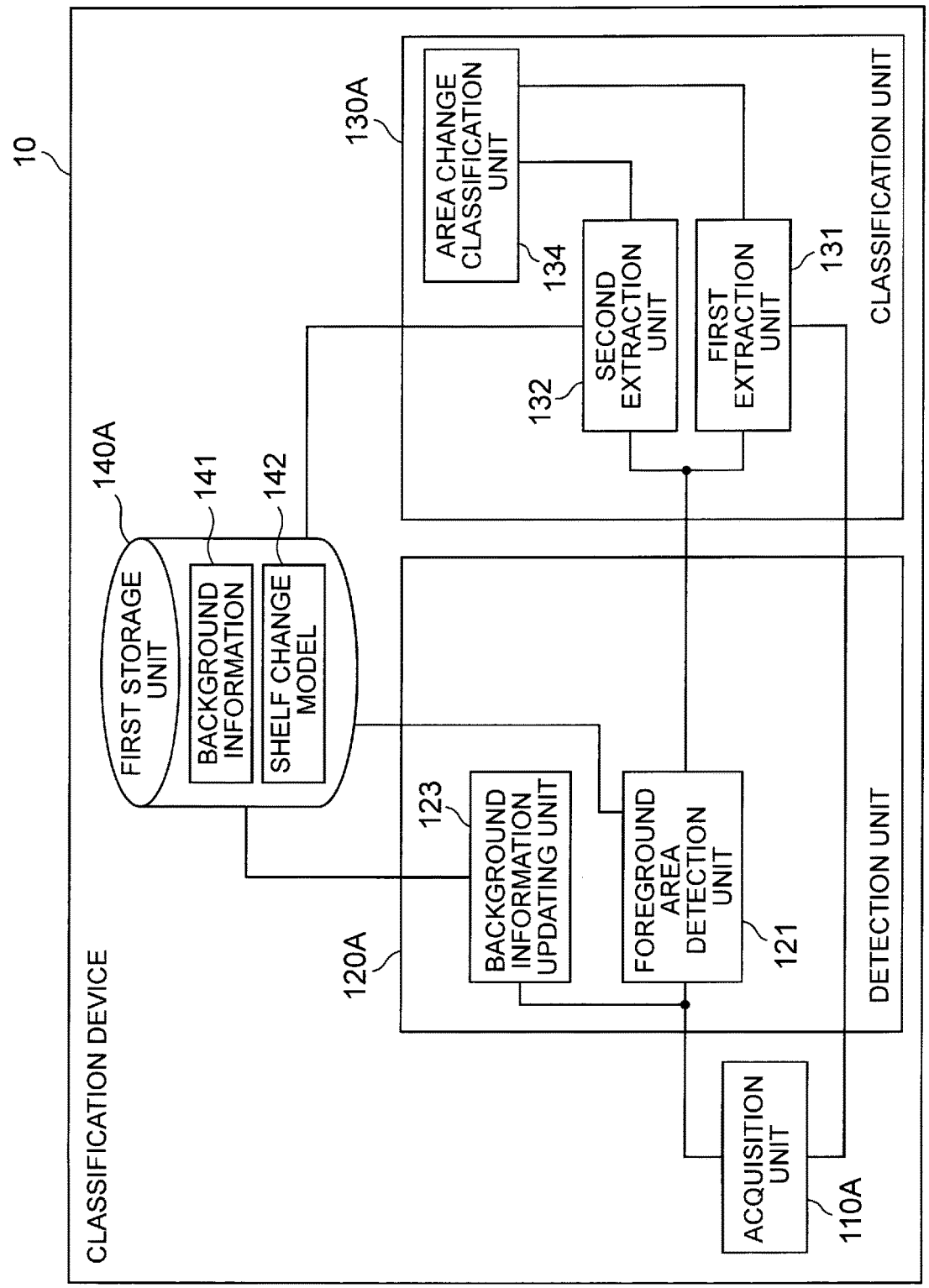
FIG. 10 It depicts a block diagram illustrating an example of a classification device 10.

FIG. 10 is a block diagram illustrating an example of the classification device 10 included in the image processing device 100 of this exemplary embodiment. The classification device 10 includes an acquisition unit 110A, a detection unit 120A, a classification unit 130A, and a first storage unit 140A.

The first storage unit 140A is an example of the first storage unit 140. The first storage unit 140A stores background information 141 and a shelf change model 142. The background information 141 is a reference image for comparison with the captured image in the detection unit 120A and is also referred to as "background image." The background information 141 is preferably, for example, the same type of image as the captured image. In this exemplary embodiment, the captured image is an RGB image as described above, and therefore preferably the background information 141 is also an RGB image. The background information 141 may be the captured image initially supplied from the acquisition unit 110A to the detection unit 120A or may be an image given in advance.

The shelf change model 142 is a model of a change in the product shelf 4, which has been learned in advance. The shelf change model 142 may be obtained by learning with machine learning such as, for example, the convolutional neural network, which is known widely in general.

The shelf change model 142 represents, for example, "a change caused by that a product is no longer contained in the product shelf 4" or "a change caused by that a product is contained anew in the product shelf 4," which has been learned by using an image in which the product is contained in the product shelf 4 and an image in which the product is not contained in the product shelf 4. In addition, the shelf change model 142 represents "a change caused by a different appearance of a product displayed on the product shelf 4," which has been learned by using an image of a plurality of products and a plurality of images in which the shape of each product has changed. Furthermore, the shelf change model 142 represents "a change caused by the presence of a person in front of the product shelf 4," "a change caused by the presence of a shopping cart in front of the product shelf 4," or the like which has been learned by using a captured image captured with no physical object in front of the product shelf 4 and a captured image captured with a physical object such as a person present in front of the product shelf 4. Furthermore, the shelf change model 142 may represent, for example, "a change caused by a change in illumination," which has been learned by using images in various environments.

Furthermore, the learning data of the shelf change model 142 may be, for example, a 6-channel image, in which two RGB images before and after the change are combined, or may be a 2-channel image, in which any one of the R, G, and B components of one RGN image before the change is combined with any one of those of the other RGB image after the change. Moreover, the learning data may be, for example, a 4-channel image, in which any two of the R, G, and B components of one RGB image before the change are combined with any two of those of the other RGB image after the change, or may be a 2-channel image, in which two RGB images before and after the change are converted to gray scale images and then combined. Moreover, the learning data may be an image obtained by converting RGB images before and after the change to images in another color space such as HSV (hue saturation value) color space, and combining one or more channels in the color space after the conversion to another color space.

Furthermore, the learning data of the shelf change model 142 may be generated from a color image such as an RGB image, or may be generated by using both of a color image and a range image.

As illustrated in FIG. 10, the detection unit 120A has a foreground area detection unit 121 and a background information updating unit 123.

The foreground area detection unit 121 receives the captured image supplied from the acquisition unit 110A. Moreover, the foreground area detection unit 121 acquires the background information 141 corresponding to the captured image from the first storage unit 140A. As described above, the background information 141 is an RGB image. The foreground area detection unit 121 compares the two RGB images (the captured image and the background information 141) with each other to detect an area changed between the two RGB images as an area of change. Since the foreground area detection unit 121 compares the background information 141, which is the background image, with the RGB image, which is the captured image, it can also be said that the foreground area detection unit 121 detects the foreground area.

The method in which the foreground area detection unit 121 detects the area of change is not particularly limited, but an existing technique may be employed therefor. The foreground area detection unit 121 may detect the area of change by using, for example, a background subtraction method disclosed in NPL 1.

The foreground area detection unit 121 supplies the generated binary image to the classification unit 130A as a result of the detection of the area of change. At this time, the foreground area detection unit 121 may add information indicating the captured image used to generate the binary image and information indicating the background information 141 to the binary image before supplying the binary image to the classification unit 130A or may supply the captured image and the background information 141 together with the binary image to the classification unit 130A.

On the basis of the captured image supplied from the acquisition unit 110A and the RGB image, which is the background information 141 stored in the first storage unit 140A, the background information updating unit 123 updates the background information 141. The method in which the background information updating unit 123 updates the background information 141 is not particularly limited, but the same method as the method described in NPL 1, for example, may be used therefor.

Figure 11A:
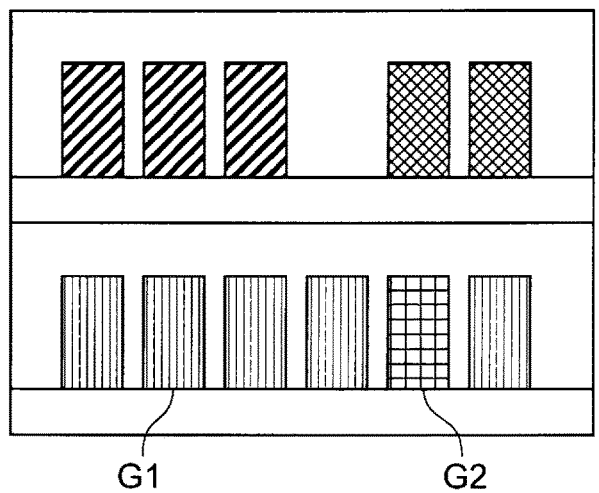
FIG. 11a through 11c It depicts an explanatory diagram illustrating an example of operation of a detection unit 120A.
Figure 11B:
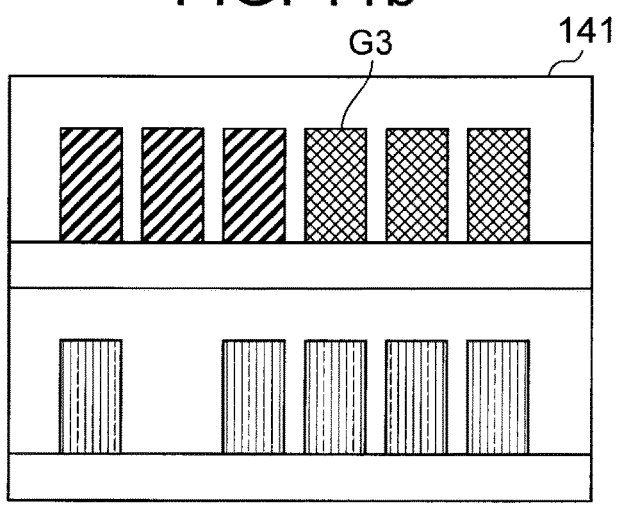

The operation of the detection unit 120A will be further described with reference to FIG. 11. FIG. 11 is an explanatory diagram illustrating an example of operation of the detection unit 120A. FIG. 11*a* is an example of the captured image, FIG. 11*b* is an example of the background information 141 corresponding to the captured image stored in the first storage unit 140A, and FIG. 11*c* is an example of a binary image, which is the detection result of the area of change.

The differences between the captured image and the background information 141 are present in the areas of products G1, G2, and G3. The product G1 is not included in the background information 141, but included in the captured image. Moreover, the product G3 is included in the background information 141, but not included in the captured image. Furthermore, another product is displayed on the background information 141 at the position of the product G2 included in the captured image. Therefore, the foreground area detection unit 121 detects the area of the product G2 as an area in which a change has occurred. Therefore, the foreground area detection unit 121 generates a binary image in which the parts corresponding to the areas of the products G1, G2, and G3 are represented in white and other parts are represented in black, as illustrated in FIG. 11*c*.

Figure 11C:
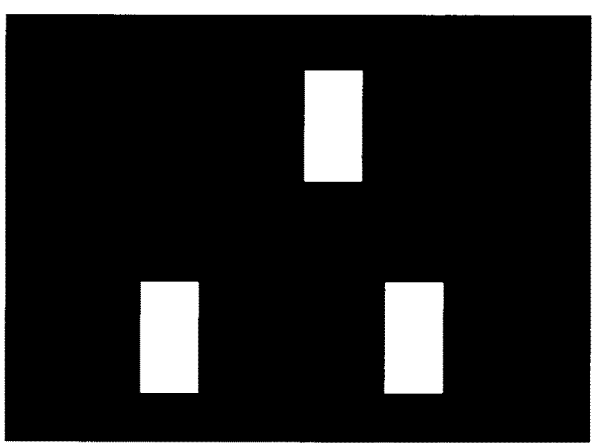

In the following description, an area of change is each of the white parts as illustrated in FIG. 11*c*. In other words, the area of change is, for example, a set of pixels with a pixel value of 255 and with any one of the pixels adjacent to those pixels having a pixel value of 255. In the example illustrated in FIG. 11*c*, the foreground area detection unit 121 detects three areas of change.

The classification unit 130A is an example of the classification unit 130. The classification unit 130A includes a first extraction unit 131, a second extraction unit 132, and an area change classification unit 134.

The first extraction unit 131 receives the binary image, which is the detection result, from the foreground area detection unit 121. In addition, the first extraction unit 131 acquires the captured image used to generate the binary image from the first storage unit 140A. The first extraction unit 131 may receive the captured image together with the binary image from the foreground area detection unit 121.

The first extraction unit 131 extracts the image of the area of change from the captured image. Specifically, the first extraction unit 131 uses the captured image and the binary image that has the same size as the captured image to extract the image of the area in the captured image corresponding to the area with the pixel value of 255 in the binary image as a first attention image. In the case where the binary image is an example illustrated in FIG. 11*c*, the first extraction unit 131 extracts three first attention images from the captured image. The captured image is an RGB image as described above, and therefore the extracted first attention image is also an RGB image.

For each area of change, the first extraction unit 131 may extract the first attention image of an area having the same shape as the area of change or may extract an image of an area surrounded by a frame having the same shape as a frame of a predetermined shape circumscribing the area of change as the first attention image. The shape of the frame circumscribing the area of change may be any shape such as, for example, a rectangle or an ellipse. Moreover, the first extraction unit 131 may also extract an image of an area surrounded by a frame that is larger than the frame circumscribing the area of change by a predetermined size as the first attention image.

The first extraction unit 131 supplies the extracted first attention image to the area change classification unit 134. The area in the captured image of the first attention image extracted by the first extraction unit 131 is also referred to as "first attention area."

The second extraction unit 132 receives the binary image, which is the detection result, from the foreground area detection unit 121. Moreover, the second extraction unit 132 acquires the background information 141 used to generate the binary image from the first storage unit 140A. The second extraction unit 132 may receive the background information 141 together with the binary image from the foreground area detection unit 121.

The second extraction unit 132 extracts the image of the area of change from the background information 141. Specifically, the second extraction unit 132 extracts the image of an area in the background information 141 corresponding to the area where the pixel value is 255 in the binary image, as the second attention image, by using the background information 141, which is a background image, and the binary image. A method of extracting the second attention image is the same as the method of extracting the first attention image. The second extraction unit 132 supplies the extracted second attention image to the area change classification unit 134. The area in the background information 141 of the second attention image extracted by the second extraction unit 132 is also referred to as "second attention area."

The area change classification unit 134 receives the first attention image from the first extraction unit 131. Moreover, the area change classification unit 134 receives the second attention image from the second extraction unit 132. On the basis of the shelf change model 142 stored in the first storage unit 140A, the area change classification unit 134 classifies a change from the state of the second attention image to the state of the first attention image corresponding to that second attention image, for example, as any one of the above-described types. For example, the area change classification unit 134 classifies the change from the state of the second attention image to the state of the first attention image on the basis of a result of comparison with the shelf change model 142.

The area change classification unit 134 may classify a change related to the product shelf 4 as any one of the types described above, for example, by using a machine learning method (convolutional neural network or the like) in which the shelf change model is created.

The area change classification unit 134 supplies the classification result to the specification unit 150. The area change classification unit 134 may store the classification result in, for example, the first storage unit 140A.

Subsequently, the operation of the image processing device 100 in a first example of this exemplary embodiment will be described with reference to FIG. 12. FIG. 12 is a flowchart illustrating an example of operation of the image processing device 100 in the first example of this exemplary embodiment.

The acquisition unit 110A acquires a captured image, which is an RGB image, from the video signal of the imaged product shelf 4 (step S61). The acquisition unit 110A supplies the acquired captured image to the detection unit 120A and to the classification unit 130A.

Subsequently, the foreground area detection unit 121 of the detection unit 120A uses the captured image, which is the RGB image supplied from the acquisition unit 110A, and the background information 141, which is the RGB image stored in the first storage unit 140A, to detect the area, which has been changed between the two RGB images, as an area of change (step S62). Then, the foreground area detection unit 121 supplies the detection result of the area of change to the classification unit 130A. For example, the classification unit 130A generates a binary image, in which the pixel value of the detected area of change is 255 and the pixel value of other areas is 0, and supplies the binary image, as the detection result of the area of change, to the classification unit 130A.

Furthermore, the background information updating unit 123 updates the background information 141 by using the captured image and the background information 141 (step S63). Step S63 may be performed at any timing after step S61.

On the basis of the captured image supplied from the acquisition unit 110A and the detection result related to the captured image supplied from the foreground area detection unit 121, the first extraction unit 131 of the classification unit 130A extracts, as the first attention image, the image of an area corresponding to the area of change (first attention area) indicated by the detection result in the captured image (step S64). The first extraction unit 131 supplies the extracted first attention image to the area change classification unit 134.

Further, on the basis of the detection result supplied from the foreground area detection unit 121 and the background information 141 used to obtain the detection result, which has been acquired from the first storage unit 140A, the second extraction unit 132 of the classification unit 130A extracts the second attention image from the background information 141 by the same operation as the operation of the first extraction unit 131 (step S65). The second extraction unit 132 supplies the extracted second attention image to the area change classification unit 134. Step S64 and step S65 may be performed simultaneously or in reverse order.

Then, the area change classification unit 134 classifies a change related to the product shelf 4 (a change from the state of the second attention image to the state of the first attention image) on the basis of the first attention image supplied from the first extraction unit 131, the second attention image supplied from the second extraction unit 132, and the shelf change model 142 stored in the first storage unit 140A (step S66).

An example of a result of the classification by the area change classification unit 134 is illustrated in FIG. 13. FIG. 13 is an explanatory diagram illustrating an example of the classification result output by the area change classification unit 134 of the classification unit 130A. The area change classification unit 134 outputs, for example, the classification result 70 illustrated in FIG. 13.

As illustrated in FIG. 13, the classification result 70 includes a second attention image 71, a first attention image 72, the type of change 73, change area information 74, a binary image identifier 75 indicating the binary image, which is a detection result of an area of change, and product shelf information 76 related to the product shelf 4 included in the captured image. The binary image identifier 75 is, for example, an identifier indicating the binary image output by the detection unit 120A, which has been stored in the first storage unit 140A or the like. The product shelf information 76 is an identifier by which the product shelf 4 is able to be specified. The classification result 70 illustrated in FIG. 13 is merely illustrative, and the classification result 70 may include information other than the information illustrated in FIG. 13. The classification result 70 may include, for example, information about the captured image (an identifier, the imaging time, or the like), information indicating the position of the first attention image 72 in the captured image, or the like.

After the end of step S66, the specification unit 150 specifies the frequency at which the customer was interested in but did not purchase the product, on the basis of the change in the product shelf 4 classified by the classification unit 130 (step S67). Then, the output control unit 160 displays an image of the mode according to the frequency at which the customer was interested in but did not purchase the product so as to be superimposed on the video of the product shelf 4 (step S68).

The image processing device 100 determines whether the acquisition unit 110A has received the next video signal (whether there is the next captured image) (step S69). If there is the next captured image (YES in step S69), the process proceeds to step S61. If there is no next captured image (NO in step S69), the image processing device 100 ends the operation.

As described above, in the image processing device 100 in the first example of this exemplary embodiment, the detection unit 120 detects the area of change in the product shelf 4 from the video of the product shelf 4, and the classification unit 130A classifies the change in the product shelf 4 in the detected area of change. Then, the specification unit 150 specifies the frequency at which the customer was interested in but did not purchase the product on the basis of the classification of the change. This enables analysis of products that customers are interested in even for the products that the customers did not purchase.

Furthermore, in the image processing device 100, the output control unit 160 (the output device 3) displays the image of the mode according to the frequency at which the customer was interested in but did not purchase the product so as to be superimposed on the area of change for the video of the product shelf 4. Thereby, the present invention enables knowing the customers' interest situation depending on the arrangements in the product shelves.

Furthermore, the classification device 10 in this example compares the captured image of the product shelf captured by the detection unit 120A with the background information indicating the image captured before the imaging time of the captured image to detect the area of change related to the product shelf 4. In addition, the classification unit 130A classifies the change related to the product shelf 4 in the area of change on the basis of the shelf change model 142, which is a model of the change related to the product shelf 4 learned in advance.

Since the shelf change model 142 is a model that represents the change related to the product shelf 4 as described above, the classification unit 130A classifies the change related to the product shelf 4 in the area detected as an area of change, as the type of a change caused by taking a product from the product shelf 4, a change caused by adding a product to the product shelf 4, or the like.

Therefore, the image processing device 100 including the classification device 10 in this example is able to specify not only that a change has occurred in a product on the product shelf 4, but also what type of change it is. Therefore, the state of the product shelf 4 is able to be determined more accurately, regarding such as whether the product shelf 4 is in a state where a product is taken or whether the product shelf 4 is replenished.

(Second Example of Classification Device 10)

Figure 14:
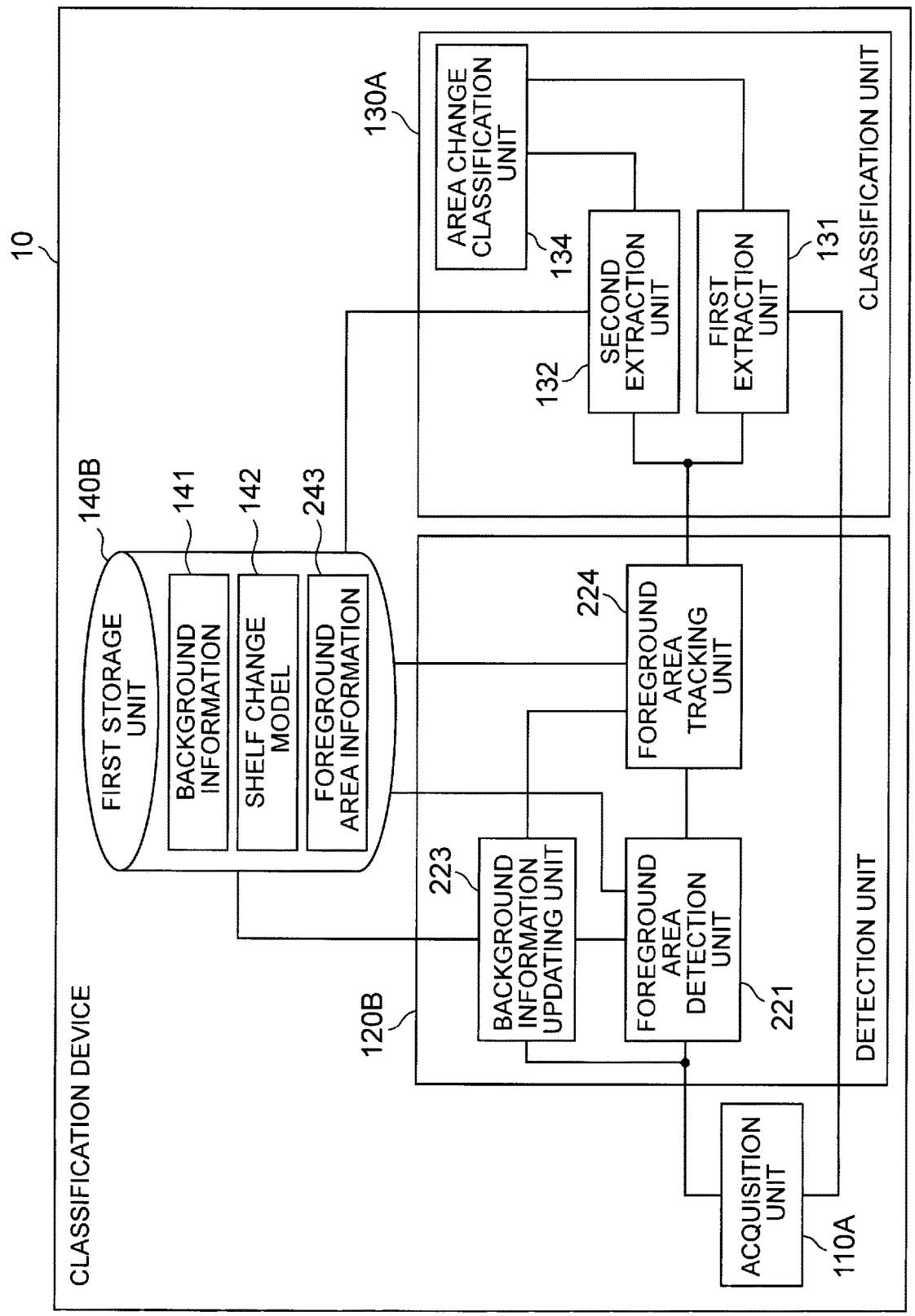
FIG. 14 It depicts block diagram illustrating another example of the classification device 10 included in the image processing device 100.

FIG. 14 is block diagram illustrating another example of the classification device 10 included in the image processing device 100 of this exemplary embodiment. The classification device 10 includes an acquisition unit 110A, a detection unit 120B, a classification unit 130A, and a first storage unit 140B. The classification device 10 in a second example tracks the area of change detected by the foreground area detection unit 221 among a plurality of RGB images. The elements having the same functions as the elements included in the above-described drawings are designated by the same reference numerals, and the description thereof will be omitted.

The detection unit 120B is an example of the detection unit 120. The first storage unit 140B is an example of the first storage unit 140.

The first storage unit 140B stores background information 141 and a shelf change model 142, similarly to the first storage unit 140A. The first storage unit 140B also stores the detection result of the foreground area detection unit 221 as foreground area information 243. The foreground area information 243 will be described later.

The detection unit 120B has a foreground area detection unit 221, a background information updating unit 223, and a foreground area tracking unit 224.

The foreground area detection unit 221 detects the area of change by the same operation as the operation of the foreground area detection unit 121. Then, the foreground area detection unit 221 generates, for example, a binary image in which the pixel value of the detected area of change is represented by 255 and the pixel value of other areas is represented by 0, as the detection result, similarly to the foreground area detection unit 121. Further, the foreground area detection unit 221 associates the binary image, which is the detection result, with the imaging time of the captured image used to generate the binary image. The foreground area detection unit 221 supplies the detection result associated with the imaging time of the captured image to the background information updating unit 223 and to the foreground area tracking unit 224. Moreover, the foreground area detection unit 221 stores the detection result, as the foreground area information 243, in the first storage unit 140B. In other words, the foreground area information 243 is a binary image associated with the imaging time of the captured image.

The foreground area tracking unit 224 tracks the area of change detected by the foreground area detection unit 221 among a plurality of captured images. The foreground area tracking unit 224 receives the detection result (binary image) supplied from the foreground area detection unit 221. Moreover, the foreground area tracking unit 224 acquires the foreground area information 243 from the first storage unit 140B, where the foreground area information 243 is the binary image generated from the captured image captured before the imaging time of the captured image related to the binary image associated with the binary image, which is the detection result. Furthermore, the foreground area tracking unit 224 tracks the area of change by performing a process of linking each area of change represented by each binary image so as to track the area of change. Note that the foreground area tracking unit 224 may calculate the similarity, for example, on the basis of at least one of the dimensions, shape, and aspect ratio of a circumscribing rectangle of the area of change, which is represented by the binary image supplied from the foreground area detection unit 221 and by the foreground area information 243 acquired from the first storage unit 140B and then may link the areas of change with the highest calculated similarity with each other. Moreover, in the case where the foreground area detection unit 221 is configured to extract the color information included in the detected area of change from the captured image and to associate the acquired color information with the detection result, the foreground area tracking unit 224 may use the color information to perform tracking. The foreground area detection unit 221 may associate the image of the area of change with the detection result, instead of the color information of the area of change.

Furthermore, in the case where the tracking result is equal to or more than the predetermined time, the foreground area tracking unit 224 supplies the binary image, which is the detection result supplied from the foreground area detection unit 221, to the classification unit 130A. At this time, the foreground area tracking unit 224 may add the information indicating the captured image used to generate the binary image and the information indicating the background information 141 to the binary image before supplying the binary image to the classification unit 130A. Moreover, the foreground area tracking unit 224 may supply the captured image and the background information 141 together with the binary image to the classification unit 130A. Furthermore, in the case where the binary image includes a plurality of areas of change and one of the areas of change has not been tracked for a predetermined time or longer, the foreground area tracking unit 224 may supply the binary image to the classification unit 130A along with the information indicating the areas of change that have been tracked for a predetermined time or longer.

Further, in the case where the binary image includes a plurality of areas of change, the foreground area tracking unit 224 may generate a plurality of binary images such that one binary image includes one area of change. The foreground area tracking unit 224 may supply, for example, a binary image including only areas of change tracked for a predetermined time or longer to the classification unit 130A and may discard a binary image including an area of change that has not been tracked for a predetermined time or longer. The foreground area tracking unit 224 may receive a binary image for each area of change, as a detection result, from the foreground area detection unit 221. The method in which the foreground area detection unit 221 generates a binary image for each area of change will be described later.

The foreground area tracking unit 224 also supplies an update signal indicating the update of the background information 141 to the background information updating unit 223.

Moreover, for example, in the case where the moving distance of the area of change is equal to or more than a predetermined threshold, the foreground area tracking unit 224 may determine that the object included in the area of change is a moving body and may discard the area of change without supplying the area of change to the classification unit 130A. Thereby, the image processing device 100 including the classification device 10 in this example is able to delete a change related to the product shelf 4 that is irrelevant to the increase or decrease in products, such as "a change caused by the presence of a person in front of the product shelf 4." Therefore, the display states of the products can be monitored more accurately.

The foreground area tracking unit 224 may supply a result of determination, in which the object included in the area of change is determined to be a moving body, to the classification unit 130A in association with the area of change. Furthermore, in the case where the determination result is associated with the area of change, the classification unit 130A may classify the change related to the product shelf 4 in this area of change as a type related to a change in an object other than a product displayed on the product shelf 4. The classification unit 130A may classify, for example, a change related to the product shelf 4 in the area of change as a type related to a change in an object other than a product such as "a change caused by the presence of a person in front of the product shelf 4," "a change caused by the presence of a shopping cart in front of the product shelf 4," or the like.

Moreover, for example, in the case of tracking the area of change and thereafter supplying the detection result indicating the area of change to the classification unit 130A, the foreground area tracking unit 224 may supply an update signal with a value of 1 to the background information updating unit 223 together with information indicating the area of change. Furthermore, in the case of not supplying the detection result to the classification unit 130A, the foreground area tracking unit 224 may supply an update signal with a value of 0 to the background information updating unit 223 together with information indicating the area of change.

The update signal with a value of 1 is an instruction to update the image of a part corresponding to the area of change in the background information 141, and the update signal with a value of 0 is an instruction not to update the image of the part corresponding to the area of change in the background information 141. For example, it is assumed that a product included in the area of change is likely to have been purchased or added as a result of determination based on tracking time included in the tracking result, product purchase information or purchase-of-stock information, store worker work information, or the like sent from an external device of the image processing device 100. In this case, the foreground area tracking unit 224 may output the update signal with a value of 1 to update the background of the product shelf 4.

The background information updating unit 223 updates the background information 141 by the same operation as the operation of the background information updating unit 123 on the basis of the captured image supplied from the acquisition unit 110A, the detection result supplied from the foreground area detection unit 221, the background information 141, and the update signal supplied from the foreground area tracking unit 224.

The background information updating unit 223 may omit to update, for example, the image of the part corresponding to the area of change indicated by the detection result supplied from the foreground area detection unit 221 in the RGB image indicated by the background information 141. For example, in the case of receiving the update signal with the value of 0 described above from the foreground area tracking unit 224, the background information updating unit 223 does not update the background information of the area corresponding to the area of change.

The foreground area tracking unit 224 supplies an update signal with a value of 0 to the background information updating unit 223 in the case where the detection result is not output to the classification unit 130A. The case where the detection result is not output to the classification unit 130 is, for example, a case where the tracking result is less than the predetermined time or a case where the moving distance of the area of change is equal to or more than a predetermined threshold. In the case where the tracking result satisfies a first predetermined condition, the background information updating unit 223 receives the update signal with a value of 0 and does not update the background information of the area corresponding to the area of change. In other words, the background information updating unit 223 updates areas other than the area corresponding to the area of change among the background information 141. This makes it easier for the foreground area detection unit 221 to detect the area corresponding to the area that has not been updated in the captured image acquired next by the acquisition unit 110A, as the area of change.

Moreover, for example, in the case where the update signal supplied from the foreground area tracking unit 224 has a value of 1, the background information updating unit 223 may update the image of the part corresponding to the area of change indicated by the detection result supplied from the foreground area detection unit 221 in the RGB image indicated by the background information 141. In the case where the tracking result is the predetermined time or longer, the foreground area tracking unit 224 supplies the detection result indicating the tracked area of change to the classification unit 130 and then supplies an update signal with a value of 1 to the background information updating unit 223. In other words, in the case where the tracking result satisfies a second predetermined condition that the tracking result is a result obtained by tracking the area of change for the predetermined time or longer, the background information updating unit 223 may receive the update signal with a value of 1 from the foreground area tracking unit 224 and may update the image of the part corresponding to the area of change in the background information 141. Thereby, the background information updating unit 223 is able to bring the background information 141 stored in the first storage unit 140B closer to the captured image acquired by the acquisition unit 110A at that time. Therefore, in the image processing device 100 including the classification device 10 in this example is able to prevent the foreground area detection unit 221 from detecting, as an area of change, the area in the captured image, which is acquired by the acquisition unit 110A next, corresponding to the above-described area of change.

The classification unit 130A classifies a change related to the product shelf 4 by the operation described in the first example. At this time, in the case of receiving both of the binary image as a detection result supplied from the foreground area detection unit 221 and the information indicating the area of change tracked for the predetermined time or longer, the first extraction unit 131 and the second extraction unit 132 may perform the extraction process of the first and second attention images for the area of change tracked for the predetermined time or longer.

Figure 15:
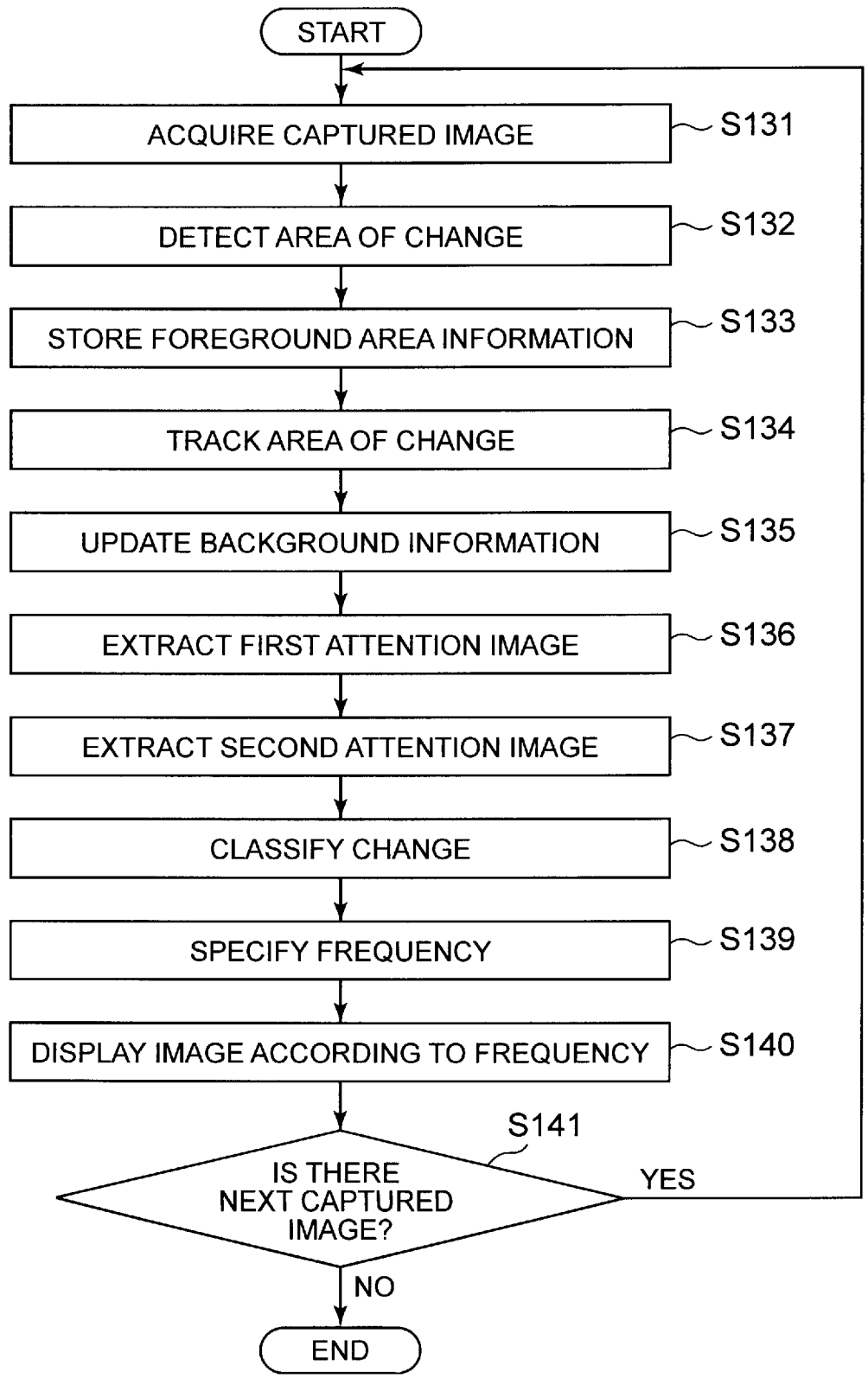
FIG. 15 It depicts a flowchart illustrating an example of operation of the image processing device 100 of a second example.

Subsequently, description will be made on the operation of the image processing device 100 in the second example of this exemplary embodiment with reference to FIG. 15. FIG. 15 is a flowchart illustrating an example of operation of the image processing device 100 of the second example of this exemplary embodiment. Steps S131 to S132 illustrated in FIG. 15 are the same as steps S61 to S62 illustrated in FIG. 12, respectively.

After the end of step S132, the foreground area detection unit 221 stores the foreground area information 243 in the first storage unit 140B (step S133). As described above, the foreground area information 243 is the detection result with which the imaging time is associated.

Subsequently, the foreground area tracking unit 224 tracks the area of change on the basis of the detection result supplied from the foreground area detection unit 221 and of the foreground area information 243 (step S134). The foreground area tracking unit 224 supplies a binary image representing the area of change tracked for the predetermined time or longer to the classification unit 130A. The foreground area tracking unit 224 supplies the update signal indicating the update of the background information 141 to the background information updating unit 223.

The background information updating unit 223 updates the background information 141 on the basis of the captured image supplied from the acquisition unit 110A, the detection result of the area of change supplied from the foreground area detection unit 221, the background information 141, and the update signal supplied from the foreground area tracking unit 224 (step S135).

Note that step S135 may be performed at any timing after step S134.

Thereafter, the image processing device 100 including the classification device 10 in the second example executes steps S136 to S141, which are the same processes as steps S64 to S69 illustrated in FIG. 12.

As described above, the image processing device 100 in the first example of this exemplary embodiment tracks the area of change detected by the detection unit 120B among a plurality of captured images, and the classification unit 130A classifies the change related to the product shelf 4 on the basis of the tracking result. The detection unit 120B supplies the detection result to the classification unit 130A, for example, in the case where the tracking result is the predetermined time or longer, and does not supply the detection result to the classification unit 130A in the case where the tracking result is less than the predetermined time. Therefore, the classification unit 130A classifies the change related to the product shelf 4 for the area of change tracked for the predetermined time or longer. Therefore, since the area where the area of change is not detected continuously is not classified, the area where a change actually occurs can be classified accurately.

Further, the detection unit 120B supplies the detection result to the classification unit 130A in the case where the moving distance of the area of change is less than the predetermined threshold, and does not supply the detection result to the classification unit 130A in the case where the moving distance of the area of change is equal to or more than the predetermined threshold. An object whose moving distance in the area of change is equal to or more than the predetermined threshold is an object other than a product. Therefore, the targets of the classification process performed by the classification unit 130A can be narrowed down to the products on the product shelf 4, by which the classification accuracy for the products on the product shelf 4 can be further improved. Further, the image processing device 100 including the classification device 10 in the second example is able to prevent the classification unit 130A from classifying a change of a moving body, such as a person, as a change in the product shelf 4.

(Third Example of Classification Device 10)

Figure 16:
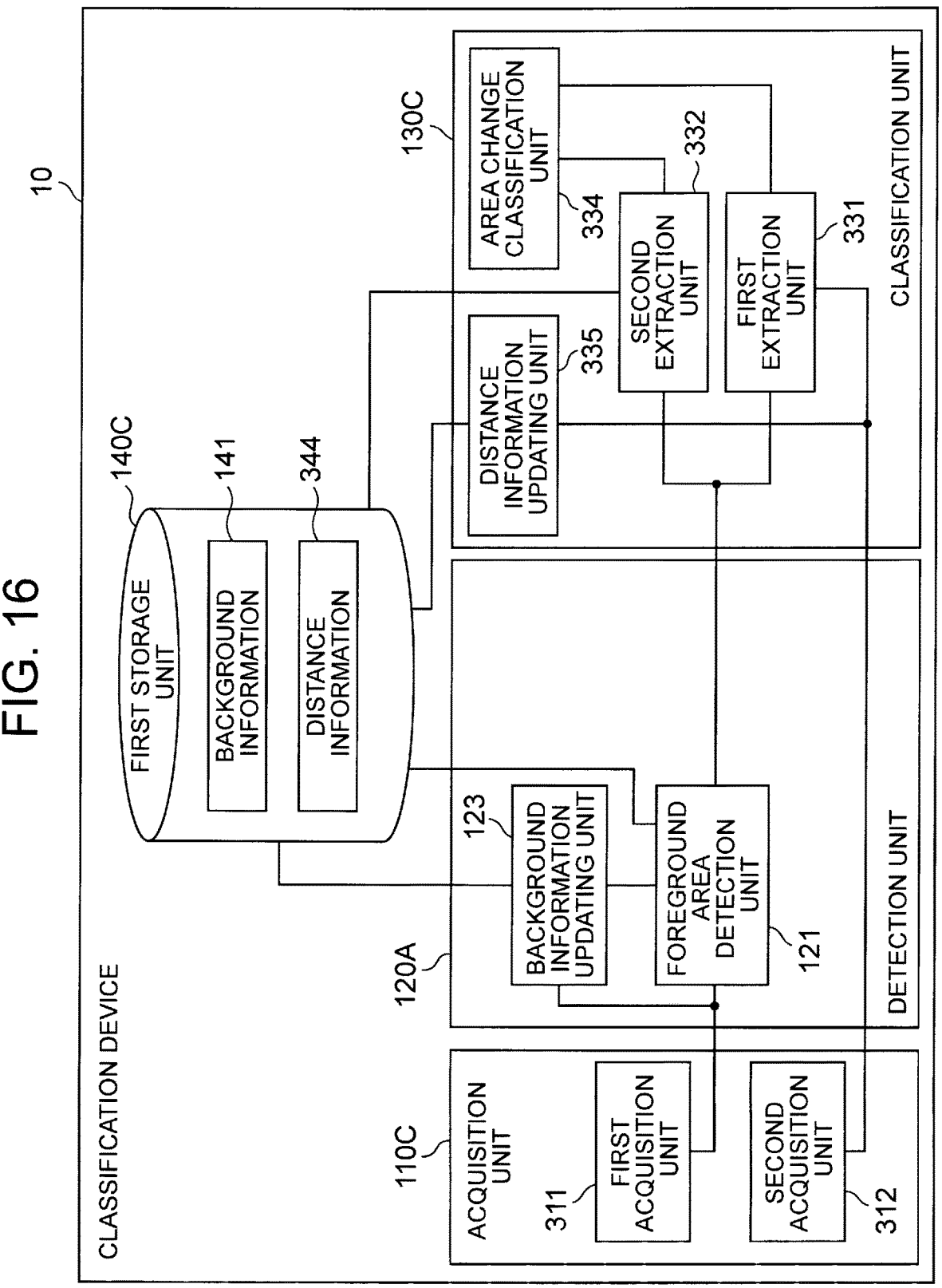
FIG. 16 It depicts a block diagram illustrating another example of the classification device 10 included in the image processing device 100.

FIG. 16 is a block diagram illustrating another example of the classification device 10 included in the image processing device 100 of this exemplary embodiment. The classification device 10 includes an acquisition unit 110C, a detection unit 120A, a classification unit 130C, and a first storage unit 140C. Note that, in this exemplary embodiment, the imaging device 2 included in the product analysis system 1 may be a plurality of imaging devices that respectively acquire different types of images. The imaging devices 2 may be, for example, an RGB camera that acquires an RGB image and a depth camera that acquires a range image. In this case, the RGB camera and the depth camera are placed close to each other and image the same target (product shelf 4). In addition, the RGB camera and the depth camera are time-synchronized and preferably these cameras image the product shelf 4 at approximately the same clock time. In other words, the depth camera is preferably a camera that outputs a range image that captures the image capturing range of the RGB image within a predetermined time from the time at which the RGB camera captured the RGB image. In addition, the imaging device 2 may also be a sensor capable of acquiring a plurality of types of images (for example, an RGB image and a range image). The imaging device 2 may be, for example, an RGBD camera.

The classification device 10 in the third example classifies the change related to the product shelf 4 in the area of change on the basis of the second captured image, which is the range image acquired by the second acquisition unit 312. The elements having the same functions as the elements included in the above-described drawings are designated by the same reference numerals, and the description thereof will be omitted.

The acquisition unit 110C includes a first acquisition unit 311 and a second acquisition unit 312.

The first acquisition unit 311 acquires a captured image, which is an RGB image, similarly to the acquisition unit 110A described above. Hereinafter, the captured image, which is the RGB image acquired by the first acquisition unit 311, is referred to as "first captured image."

Similarly to the first acquisition unit 311, the second acquisition unit 312 receives the video signal indicating the captured image obtained by the imaging device 2 by imaging the product shelf 4 and then acquires the range image from the video signal. The second acquisition unit 312 receives a video signal of a different type from the video signal acquired by the first acquisition unit 311. For example, in the case where the video signal acquired by the first acquisition unit 311 is a video signal that constitutes an RGB image, the second acquisition unit 312 acquires a video signal that constitutes a range image. Note that the range image may mean, for example, an image with the value of a distance from the imaging device 2 to the physical object. Moreover, each pixel in the range image may be represented by a value of 0 to 255, for example. At this time, the value of each pixel, in other words, a distance value, may be close to 0 if the physical object is close to, for example, the information acquisition device, and may be close to 255 if the physical object is far from the information acquisition device. Note that, however the value of each pixel in the range image is not limited thereto. In this exemplary embodiment, description will be made assuming that the second captured image acquired by the second acquisition unit 312 is a grayscale range image.

Similarly to the first acquisition unit 311, the second acquisition unit 312 may acquire a video signal converted on the basis of the captured image stored inside the imaging device 2 or stored in a storage device different from the imaging device 2 and from the image processing device 100. Further, in the case where the image processing device 100 is built in the imaging device 2, the second acquisition unit 312 may be configured to acquire the captured image itself.

The second acquisition unit 312 converts the acquired video signal to a range image constituting the video signal and supplies the range image to the classification unit 130C. The range image obtained by the second acquisition unit 312 by converting the video signal or the captured image acquired from the imaging device 2 will be hereinafter referred to as "second captured image."

The first acquisition unit 311 and the second acquisition unit 312 may be integrally formed. The first captured image and the second captured image are associated with each other on the basis of information indicating the imaging position and of the imaging time.

The first storage unit 140C stores the background information 141 similarly to the first storage unit 140A and the first storage unit 140B. In addition, the first storage unit 140C stores distance information 344. The distance information 344 will be described later.

The classification unit 130C has a first extraction unit 331, a second extraction unit 332, an area change classification unit 334, and a distance information updating unit 335.

The first extraction unit 331 extracts the image of the area of change from the second captured image. Specifically, the first extraction unit 331 uses the second captured image, which is the range image supplied from the second acquisition unit 312, and the binary image, which is the detection result supplied from the foreground area detection unit 121, to extract the image of the area in the second captured image corresponding to the area with a pixel value of 255 in the binary image, as a first attention image. The first extraction unit 331 may extract the first attention image in the same method as in the first extraction unit 131 described above. Then, the first extraction unit 331 supplies the extracted first attention image to the area change classification unit 334.

The second extraction unit 332 extracts the image of the area of change from a range image obtained before the imaging time of the range image, which is the second captured image associated with the first captured image used by the foreground area detection unit 121 to generate the binary image. Specifically, the second extraction unit 332 receives the binary image, which is a detection result, from the foreground area detection unit 121. The second extraction unit 332 acquires distance information 344, which is the second captured image captured before the imaging time of the first captured image used to generate the binary image, from the first storage unit 140C.

The distance information 344 is the second captured image updated by the second acquisition unit 312, which will be described later, and is the range image acquired by the second acquisition unit 312. The distance information 344 is associated with the imaging time. Since the first captured image and the second captured image are time-synchronized with each other as described above, the imaging time of the first captured image and the imaging time of the second captured image, which is associated with the first captured image, are almost the same as each other. Therefore, it can be said that the second extraction unit 332 extracts the image of the area of change as a second attention image, from the (past) second captured image captured before the second captured image for which the first extraction unit 331 performs the extraction process.

Note that the second extraction unit 332 extracts the second attention image in the same method as the method in which the first extraction unit 331 extracts the first attention image. The second extraction unit 332 supplies the extracted second attention image to the area change classification unit 334.

The distance information updating unit 335 updates the distance information 344 on the basis of the range image supplied from the second acquisition unit 312 and of the distance information 344 stored in the first storage unit 140C. The distance information updating unit 335 may update the distance information 344, for example, by the same operation as the operation of the background information updating unit 123.

The area change classification unit 334 classifies the change related to the product shelf 4 in the area of change on the basis of the distance information in the area of change. The area change classification unit 334, first, receives the first attention image from the first extraction unit 331. Moreover, the area change classification unit 334 receives the second attention image from the second extraction unit 332. The area change classification unit 334 classifies the change related to the product shelf 4 in the area of change on the basis of the first attention image and the second attention image.

The area change classification unit 334 may classify the change, for example, on the basis of a calculation result obtained by subtracting the value (distance value) of each pixel in the second attention image from the value (distance value) of each pixel in the first attention image. For example, in the case where the calculation result is a value equal to or more than a first predetermined threshold, in other words, in the case where the physical object included in the first attention image is deeper than the physical object included in the second attention image, the area change classification unit 334 may classify the change related to the product shelf 4 in the area of change as "a change caused by that a product is no longer contained in the product shelf 4." Further, for example, in the case where the calculation result is a value equal to or less than a second predetermined threshold, in other words, in the case where the physical object included in the first attention image is closer to the imaging device 2 than the physical object included in the second attention image is, the area change classification unit 334 may classify the change related to the product shelf 4 in the area of change as "a change caused by that a product is contained anew in the product shelf 4." In addition, in other cases, the area change classification unit 334 may classify the change related to the product shelf 4 in the area of change as "a change caused by a different appearance of a product displayed on the product shelf 4" or "a change caused by a change in illumination."

In addition, the area change classification unit 334 may, for example, cluster the distance value of each pixel in the first attention image and the distance value of each pixel in the second attention image to define the distance value of the class with the largest number of elements as a distance value that represents each attention image and further may obtain the coordinates of the cluster of the class of each attention image. Then, for example, in the case where the absolute value of the difference between the distance values representing the respective attention images is within a third predetermined threshold and the difference between the coordinates of the clusters of the classes of the respective attention images is equal to or more than a fourth predetermined threshold, the area change classification unit 334 may classify the change related to the product shelf 4 in the area of change as "a change caused by a different appearance of a product displayed on the product shelf 4."

Further, the area change classification unit 334 may use, for example, a result of subtracting the distance value representing the first attention image from the previously-set value of a distance from the imaging device 2 to the product shelf 4 to classify the change related to the product shelf 4 in the area of change as a type related to a change in a product displayed on the product shelf 4 or a type related to a change caused by an object other than the product displayed on the product shelf 4. For example, it is assumed that the above result is a positive value, in other words, that the physical object included in the image of the part corresponding to the area of change in the captured image is present between the imaging device 2 and the product shelf 4. In this case, the area change classification unit 334 may classify the change related to the product shelf 4 in that area of change as the type related to "a change caused by an object other than a product displayed on the product shelf 4." The type related to "a change caused by an object other than a product displayed on the product shelf 4" is at least one of, for example, "a change caused by the presence of a person in front of the product shelf 4," "a change caused by the presence of a shopping cart in front of the product shelf 4," and "a change caused by the presence of a person and a shopping basket in front of the product shelf 4." Moreover, if the above result is not a positive value, the area change classification unit 334 may classify the change related to the product shelf 4 in that area of change as the type related to "a change in a product displayed on the product shelf 4." In this manner, the area change classification unit 334 is able to reduce the processing cost of the classification process by performing the classification process by using the first attention image and the preset distance values.

Figure 17:
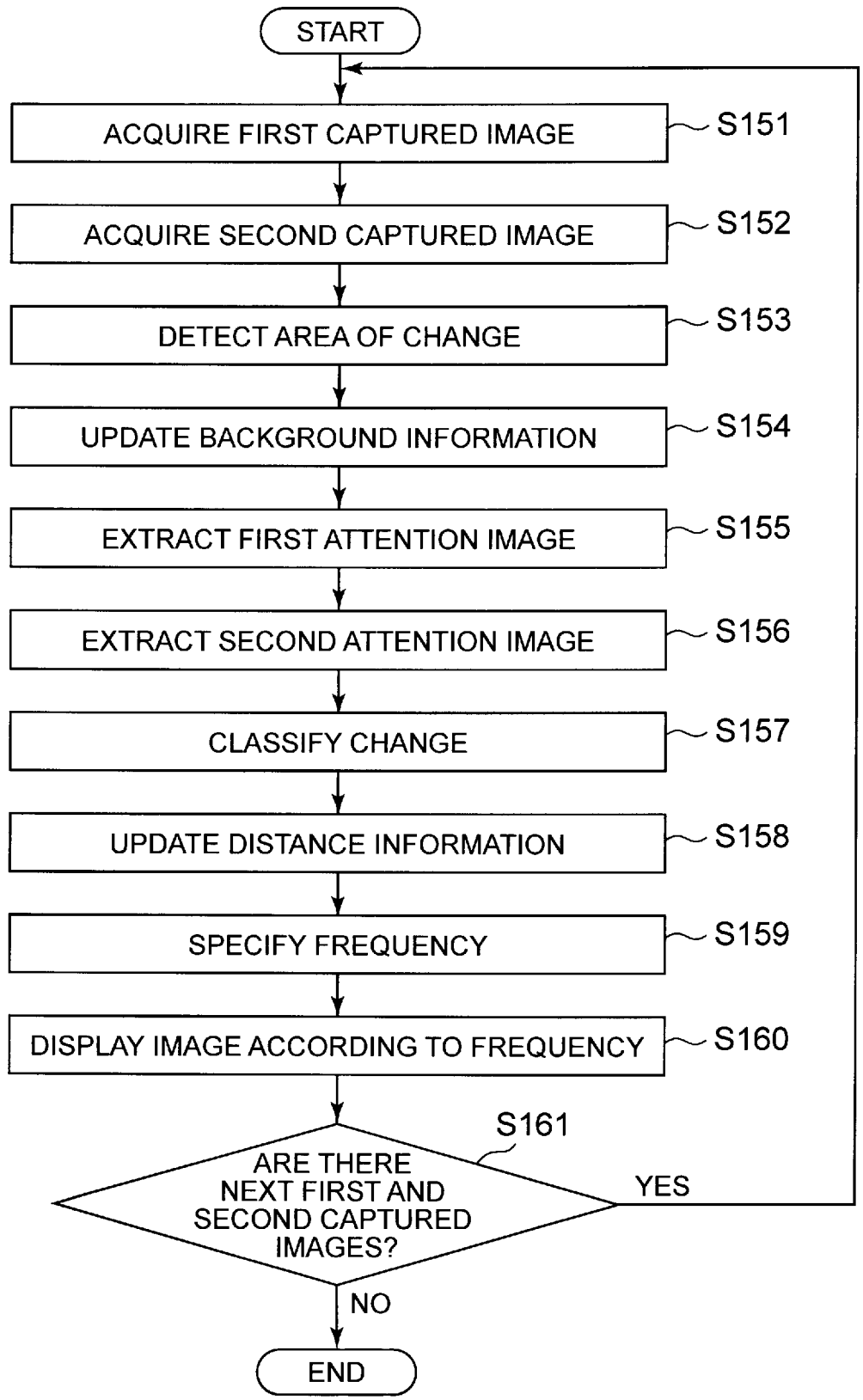
FIG. 17 It depicts a flowchart illustrating an example of operation of the image processing device 100 including the classification device 10 in a third example.

Subsequently, referring to FIG. 17, description will be made on the operation of the image processing device 100 including the classification device 10 in the third example. FIG. 17 is a flowchart illustrating an example of operation of the image processing device 100 including the classification device 10 in the third example.

In step S151 illustrated in FIG. 17, the first acquisition unit 311 acquires the first captured image, which is an RGB image, from the video signal of the product shelf 4, similarly to step S61 illustrated in FIG. 12 (step S151). Moreover, the second acquisition unit 312 acquires the second captured image, which is a range image, from the video signal obtained by imaging the product shelf 4 (step S152). The imaging time of the second captured image has only to be within a predetermined time from the time at which the first captured image is captured, and the imaging range of the second captured image has only to be the imaging range of the first captured image. The timing at which the second acquisition unit 312 acquires the second captured image has only to be before step S155.

Then, similarly to steps S62 and S63 illustrated in FIG. 12, the foreground area detection unit 121 detects the area of change (step S153), and the background information updating unit 123 updates the background information 141 (step S154).

Then, the first extraction unit 331 of the classification unit 130C extracts an image of the area (first attention area) corresponding to the area of change indicated by the detection result in the second captured image, as a first attention image, on the basis of the second captured image supplied from the second acquisition unit 312 and of the detection result supplied from the foreground area detection unit 121 (step S155). The first extraction unit 331 supplies the extracted first attention image to the area change classification unit 334.

Furthermore, the second extraction unit 332 of the classification unit 130C extracts the second attention image from the distance information 344 by the same operation as the operation of the first extraction unit 331, on the basis of the detection result supplied from the foreground area detection unit 121 and of the distance information 344 indicating the second captured image captured before the imaging time of the second captured image supplied to the first extraction unit 331, which has been acquired from the first storage unit 140C (step S156). The second extraction unit 332 supplies the extracted second attention image to the area change classification unit 334. Note that step S155 and step S156 may be performed simultaneously or in reverse order.

Then, the area change classification unit 334 classifies the change related to the product shelf 4 in the area of change on the basis of a result of comparison between the value of each pixel in the first attention image and the value of each pixel in the second attention image (step S157).

Subsequently, the distance information updating unit 335 updates the distance information 344 on the basis of the second captured image supplied from the second acquisition unit 312 and of the distance information 344 (step S158). Then, the classification device 10 performs the same processes as steps S67 to S68 illustrated in FIG. 12 (steps S159 to S160).

Then, the image processing device 100, which includes the classification device 10 in this example, determines whether the first acquisition unit 311 has received the next video signal and further the second acquisition unit 312 has received the next video signal (whether the next first captured image and the next second captured image are present) (step S161). If the next first captured image and the next second captured image are present (YES in step S161), the process proceeds to step S151. On the other hand, if at least one of the next first captured image and the next second captured image is not present (NO in step S161), the image processing device 100 including the classification device 10 in this example ends the operation.

As described above, the detection unit 120A of the image processing device 100 including the classification device 10 in the third example detects the area of change by comparing the first captured image, which is an RGB image, with the background information 141 indicating the image captured before the imaging time of the first captured image. Moreover, the classification unit 130C of the image processing device 100 including the classification device 10 in the third example classifies the change related to the product shelf 4 on the basis of a result of comparison between the value of each pixel included in the second captured image, which is a range image, with the value of each pixel in the distance information 344 captured before the imaging time of the second captured image. Even with this configuration, the present invention is able to determine the state of the product shelf 4 more accurately.

(Fourth Example of Classification Device 10)

Figure 18:
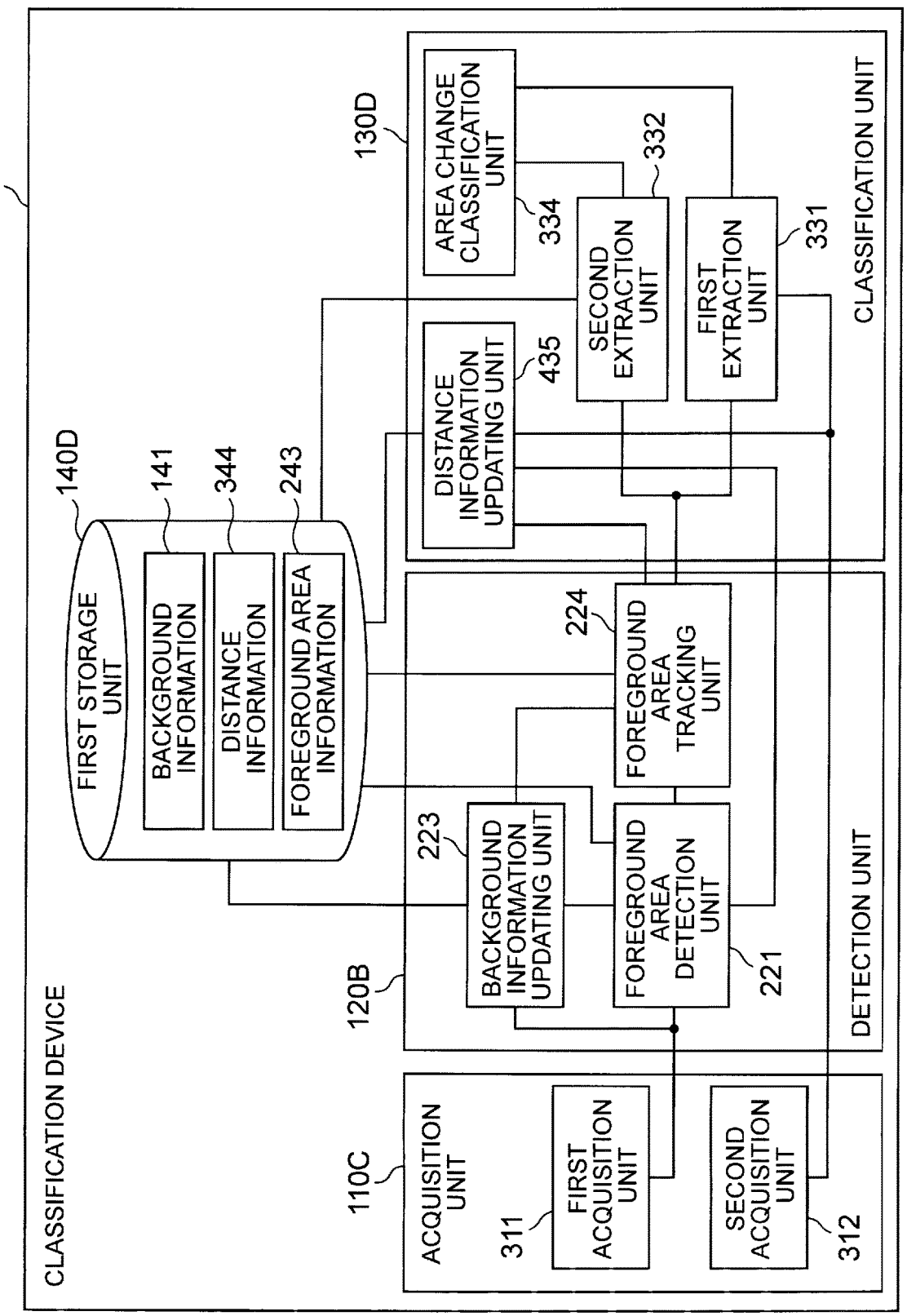
FIG. 18 It depicts a block diagram illustrating another example of the classification device 10 included in the image processing device 100.

FIG. 18 is a block diagram illustrating another example of the classification device 10 included in the image processing device 100 of this exemplary embodiment. The classification device 10 includes an acquisition unit 110C, a detection unit 120B, a classification unit 130D, and a first storage unit 140D.

In the classification device 10 in this example, the detection unit 120B further includes a foreground area tracking unit 224 to track the area of change detected by the foreground area detection unit 221 among a plurality of RGB images. The elements having the same functions as the elements included in the above-described drawings are designated by the same reference numerals, and the description thereof will be omitted.

In this example, the foreground area tracking unit 224 may output the update signal to the distance information updating unit 435.

The first storage unit 140D stores the background information 141 and the distance information 344 similarly to the first storage unit 140C and further stores the foreground area information 243.

The classification unit 130D has a first extraction unit 331, a second extraction unit 332, an area change classification unit 334, and a distance information updating unit 435. The distance information updating unit 435 updates the distance information by the same operation as the operation of the distance information updating unit 335.

Moreover, the distance information updating unit 435 can omit the update of, for example, the part corresponding to the area of change indicated by the binary image supplied from the foreground area detection unit 221, in the range image indicated by the distance information 344. In other words, the distance information updating unit 435 may update the part other than the part corresponding to the area of change in the range image indicated by the distance information 344. The distance information updating unit 435 does not update the distance information of the part corresponding to the area of change, by which the difference in the part corresponding to the area of change is clarified between the second captured image acquired by the second acquisition unit 312 and the range image captured before (past time) the imaging time of the second captured image.

Moreover, for example, in the case where the update signal supplied from the foreground area tracking unit 224 has a value of 1, the distance information updating unit 435 may update the part corresponding to the area of change indicated by the detection result supplied from the foreground area detection unit 221 in the range image indicated by the distance information 344. In other words, the distance information updating unit 435 may update the distance information of the part corresponding to the area of change in the distance information 344 after the detection result (binary image) representing the area of change tracked by the foreground area tracking unit 224 is supplied to the classification unit 130D. Thereby, the distance information updating unit 435 is able to bring the distance information 344 stored in the first storage unit 140D closer to the second captured image acquired by the second acquisition unit 312 at that time. Therefore, the image processing device 100 including the classification device 10 in this example is able to further increase the accuracy of the result of comparison between distance values performed by the area change classification unit 334 by using the area in the second captured image acquired next by the second acquisition unit 312 that corresponds to the area of change.

Figure 19:
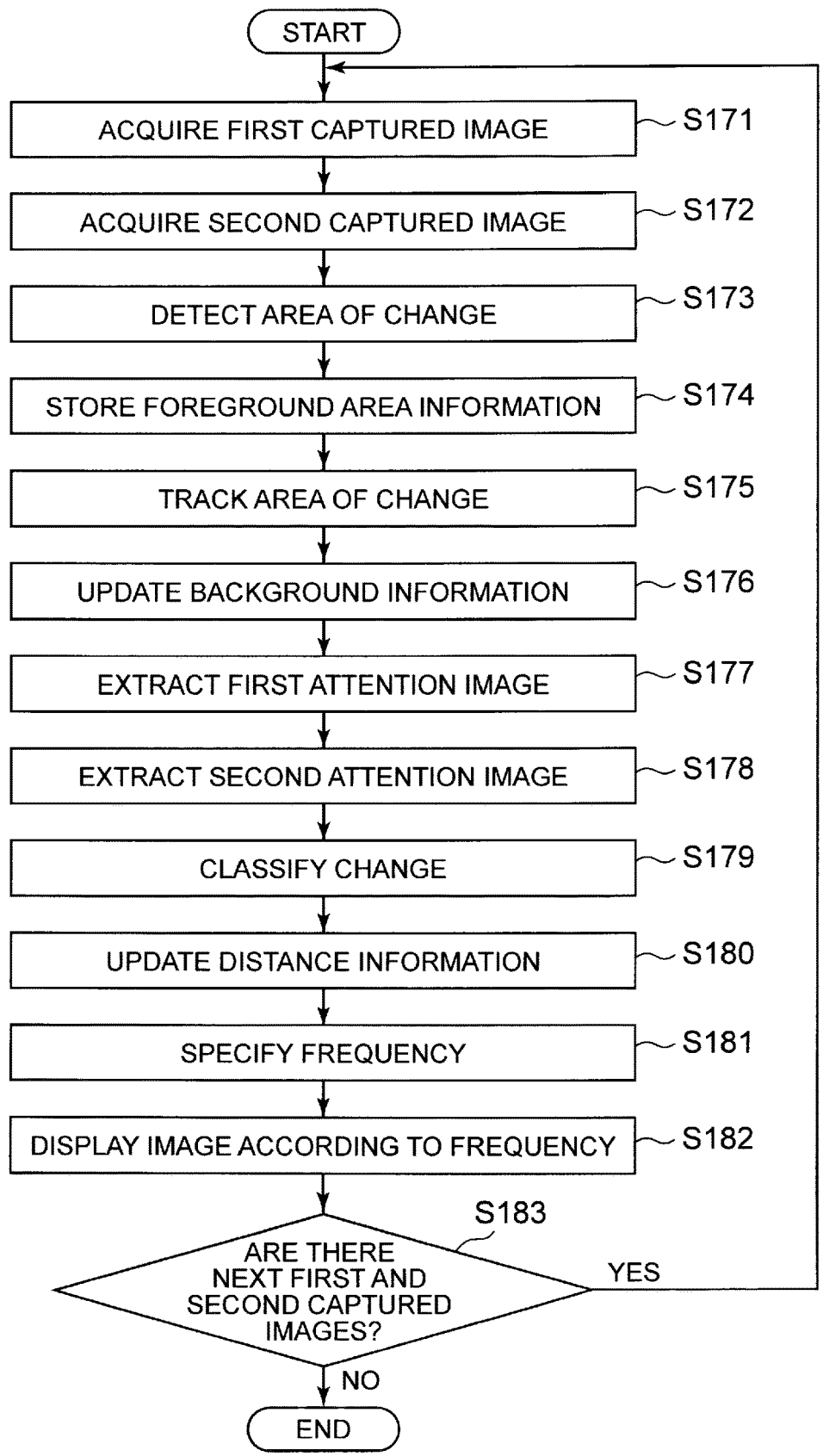
FIG. 19 It depicts a flowchart illustrating an example of operation of the image processing device 100 including the classification device 10 in a fourth example.

Subsequently, referring to FIG. 19, description will be made on the operation of the image processing device 100 including the classification device 10 in the fourth example. FIG. 19 is a flowchart illustrating an example of operation of the image processing device 100 including the classification device 10 in the fourth example.

Steps S171 to S173 illustrated in FIG. 19 are the same processes as those of steps S151 to S153 illustrated in FIG. 17, respectively.

After the end of step S173, the foreground area detection unit 221 stores the foreground area information 243 in the first storage unit 140D, similarly to step S133 described above (step S174). Then, similarly to step S134 described above, the foreground area tracking unit 224 tracks the area of change on the basis of the detection result supplied from the foreground area detection unit 121 and of the foreground area information 243 (step S175). The foreground area tracking unit 224 supplies a binary image representing the area of change tracked for a predetermined time or longer to the classification unit 130D. The foreground area tracking unit 224 supplies the update signal indicating the update of the background information 141 and the update signal indicating the update of the distance information 344 to the background information updating unit 223 and to the distance information updating unit 435, respectively.

Similarly to step S135 described above, the background information updating unit 223 updates the background information 141, on the basis of the first captured image supplied from the first acquisition unit 311, the detection result of the area of change supplied from the foreground area detection unit 221, the background information 141, and the update signal supplied from the foreground area tracking unit 224 (step S176).

Thereafter, the classification device 10 performs the same processes as those of steps S155 to S157 illustrated in FIG. 17 (steps S177 to S179). Then, the distance information updating unit 435 updates the distance information 344 on the basis of the second captured image supplied from the second acquisition unit 312, the distance information 344, and the update signal supplied from the foreground area tracking unit 224 (step S180).

Thereafter, the classification device 10 performs the same processes as those of steps S159 to S161 illustrated in FIG. 17 (steps S181 to S183).

As described above, the classification device 10 in this example includes the classification device 10 in the third example and further the foreground area tracking unit 224 described in the second example. Even with this configuration, the present invention is able to accurately classify an area in which a change actually occurs.

(Fifth Example of Classification Device 10)

Figure 20:
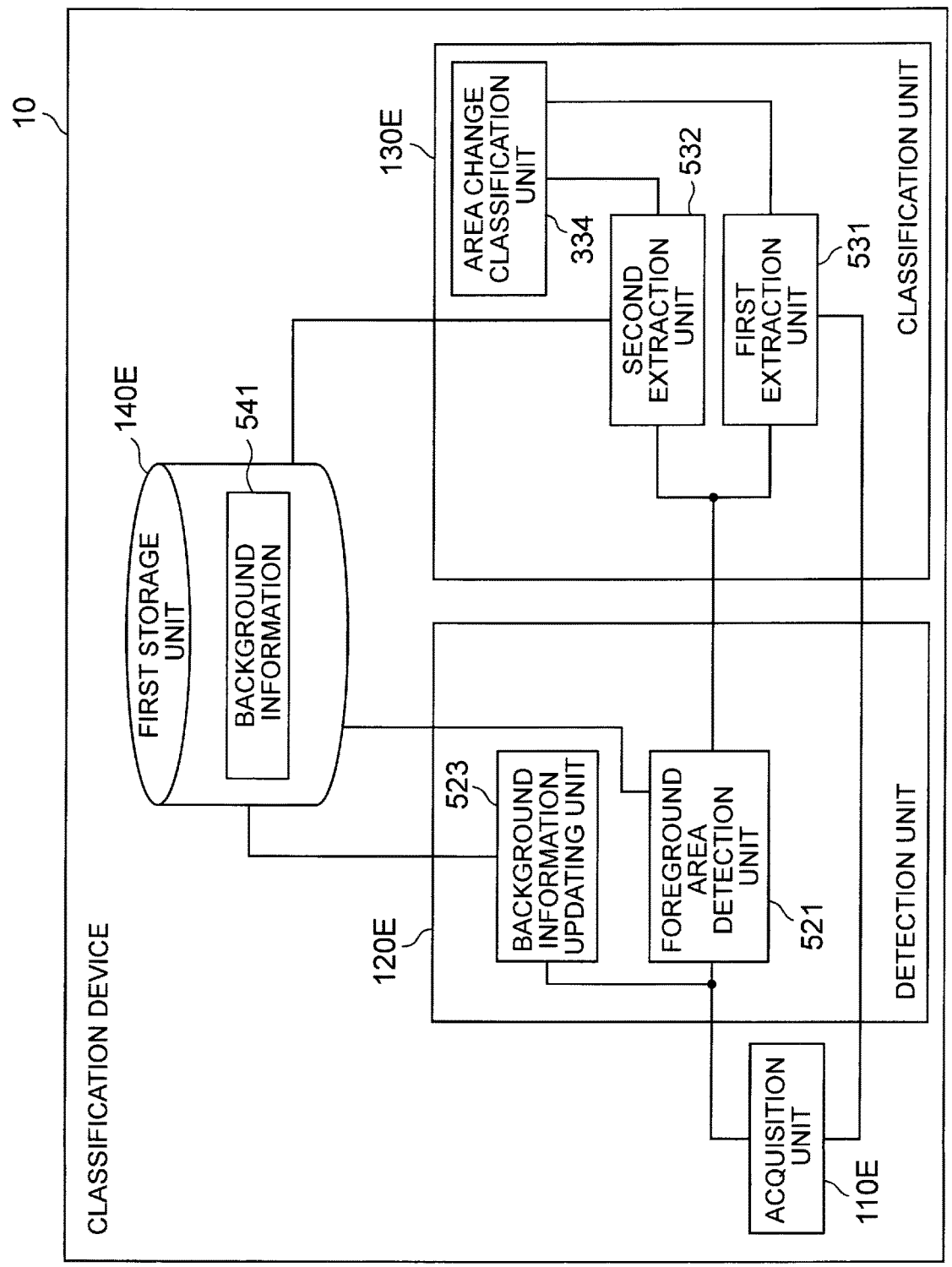
FIG. 20 It depicts a block diagram illustrating another example of the classification device 10 included in the image processing device 100.

FIG. 20 is a block diagram illustrating another example of the classification device 10 included in the image processing device 100 of this exemplary embodiment. In the above-described first to fourth examples, description has been made by giving an example that the captured image input to the detection unit 120A or to the detection unit 120B is an RGB image. The image input to the detection unit, however, may be a range image. The fifth example illustrates a case where a range image is input to the detection unit of classification device 10. The elements having the same functions as the elements included in the above-described drawings are designated by the same reference numerals, and the description thereof will be omitted.

The classification device 10 in the fifth example includes an acquisition unit 110E, a detection unit 120E, a classification unit 130E, and a first storage unit 140E.

The acquisition unit 110E acquires a captured image that is a range image, similarly to the second acquisition unit 312 described above. The acquisition unit 110E supplies the acquired captured image to the detection unit 120E and to the classification unit 130E.

The first storage unit 140E stores background information 541. The background information 541 is an image that serves as a reference for comparison with the captured image in the detection unit 120E and is also referred to as "background image." As described above, the captured image is a range image in this example. Therefore, the background information 541 is preferably a range image, which is the same type of image as the captured image. Note that the background information 541 may be the captured image initially supplied from the acquisition unit 110E to the detection unit 120E, or may be the image given in advance.

The background information 541 is the same as the distance information 344 described above.

The detection unit 120E has a foreground area detection unit 521 and a background information updating unit 523. The foreground area detection unit 521 receives the captured image supplied from the acquisition unit 110E. The foreground area detection unit 521 acquires the background information 541 corresponding to the captured image from the first storage unit 140E. The foreground area detection unit 521 detects an area changed between two range images as an area of change (foreground area). The foreground area detection unit 521 may detect the area of change by the same operation as, for example, the operation of the foreground area detection unit 121. Similarly to the foreground area detection unit 121, the foreground area detection unit 521 generates a binary image in which the pixel value of the detected area of change is represented by 255 and the pixel value of other areas is represented by 0, as the detection result of the area of change, and then supplies the generated binary image to the classification unit 130E.

The background information updating unit 523 updates the background information 541 on the basis of the captured image supplied from the acquisition unit 110E and of the range image, which is the background information 541 stored in the first storage unit 140E. In this respect, the background information updating unit 523 may update the background information 541 by the same operation as, for example, the operation of the background information updating unit 123.

The classification unit 130E has a first extraction unit 531, a second extraction unit 532, and an area change classification unit 334.

Similarly to the first extraction unit 331, the first extraction unit 531 extracts the first attention image from the captured image. Then, the first extraction unit 531 supplies the extracted first attention area to the area change classification unit 334.

The second extraction unit 532 extracts the image of the area of change, as the second attention image, from the background information 541. The method of extracting the second attention image by the second extraction unit 532 is the same as the method of the second extraction unit 332.

The area change classification unit 334 classifies the change related to the product shelf 4 in the area of change on the basis of the distance information on the area of change, similarly to the area change classification unit 334 described in the third example.

Figure 21:
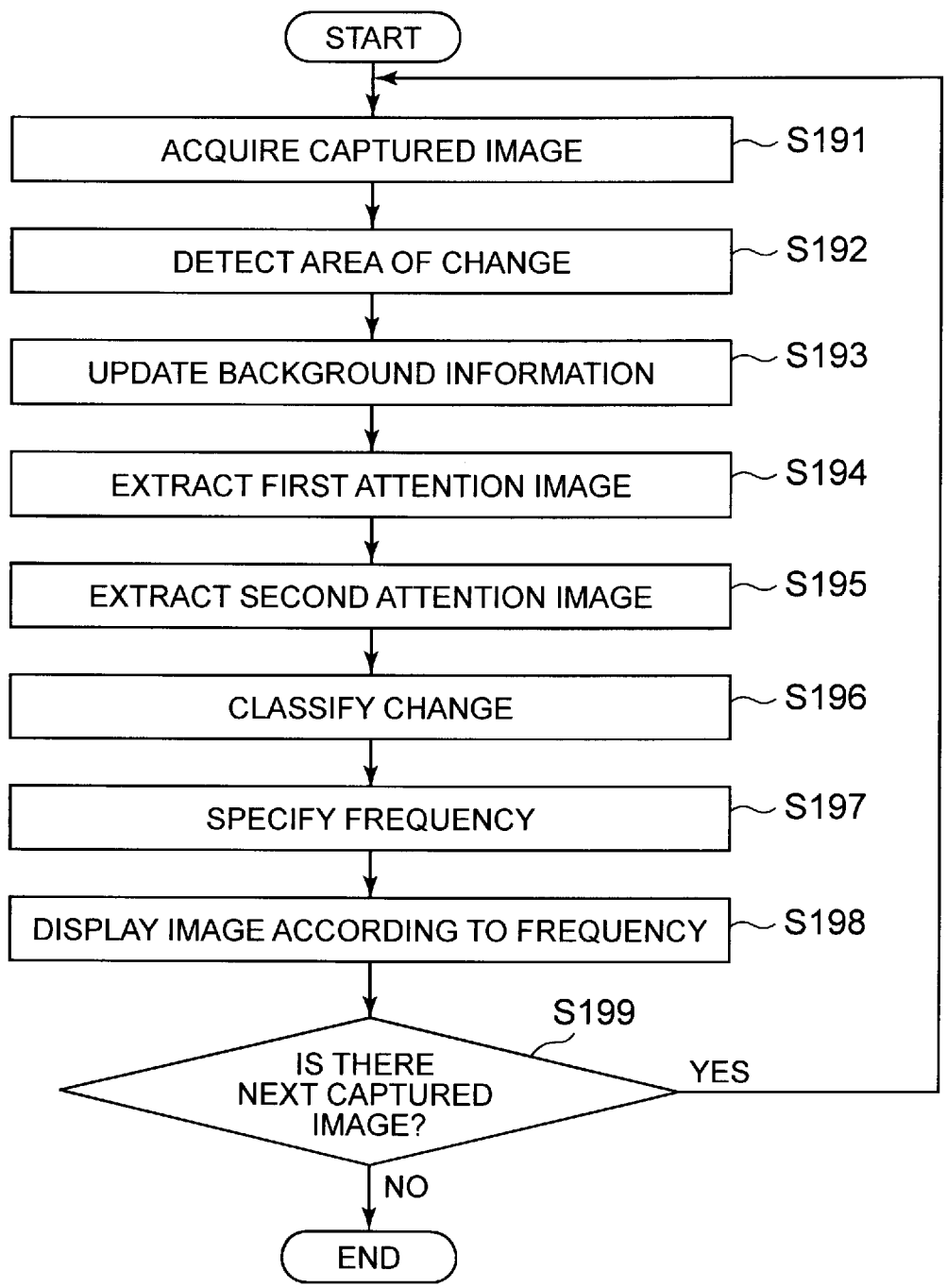
FIG. 21 It depicts a flowchart illustrating an example of operation of the image processing device 100 including the classification device 10 in a fifth example.

Subsequently, referring to FIG. 21, description will be made on the operation of the image processing device 100 including the classification device 10 in the fifth example. FIG. 21 is a flowchart illustrating an example of operation of the image processing device 100 including the classification device 10 in a fifth example.

First, the acquisition unit 110E acquires a captured image, which is a range image, from the video signal of the product shelf 4 (step S191). The acquisition unit 110E supplies the acquired captured image to the detection unit 120E and to the classification unit 130E.

Subsequently, the foreground area detection unit 521 of the detection unit 120E detects the area that has changed between two range images, as the area of change, by using the captured image, which is the range image supplied from the acquisition unit 110E, and the background information 541, which is a range image stored in the first storage unit 140E (step S192). Then, the foreground area detection unit 521 supplies the detection result of the area of change to the classification unit 130E.

The background information updating unit 523 updates the background information 541 by using the captured image and the background information 541 (step S193). Note that step S193 may be performed at any timing after step S191.

The first extraction unit 531 of the classification unit 130E extracts the image of the area (first attention area) corresponding to the area of change indicated by the detection result in the captured image, as the first attention image, on the basis of the captured image supplied from the acquisition unit 110E and of the detection result related to the captured image supplied from the foreground area detection unit 521 (step S194). The first extraction unit 531 supplies the extracted first attention image to the area change classification unit 334.

In addition, the second extraction unit 532 of the classification unit 130E extracts the second attention image from the background information 541 by the same operation as the operation of the first extraction unit 531, on the basis of the detection result supplied from the foreground area detection unit 521 and of the background information 541, which has been acquired from the first storage unit 140E, used to obtain the detection result (step S195). The second extraction unit 532 supplies the extracted second attention image to the area change classification unit 334. Note that step S194 and step S195 may be performed simultaneously or in reverse order.

The area change classification unit 334 classifies the change related to the product shelf 4 (a change from the state in the second attention image to the state in the first attention image) on the basis of the first attention image supplied from the first extraction unit 531 and of the second attention image supplied from the second extraction unit 532 (step S196).

Then, the classification device 10 performs the same processes as those of steps S67 to S68 illustrated in FIG. 12 (steps S197 to S198). Then, the image processing device 100 including the classification device 10 determines whether or not the acquisition unit 110E has received the next video signal (whether or not the next captured image is present) (step S199). If the next captured image is present (YES in step S199), the process proceeds to step S191, and unless the next captured image is present (NO in step S199), the image processing device 100 ends the operation.

As described above, the detection unit 120E of the classification device 10 in this example detects the area of change by comparing the captured image, which is a range image, with the background information 541, which indicates the image captured before the imaging time of the captured image. Then, the classification unit 130E classifies the change related to the product shelf 4 on the basis of a result of the comparison between the value of each pixel included in the captured image and the value of each pixel in the background information 541. Even with this configuration, the present invention is able to determine the state of product shelf 4 more accurately.

(Sixth Example of Classification Device 10)

Figure 22:
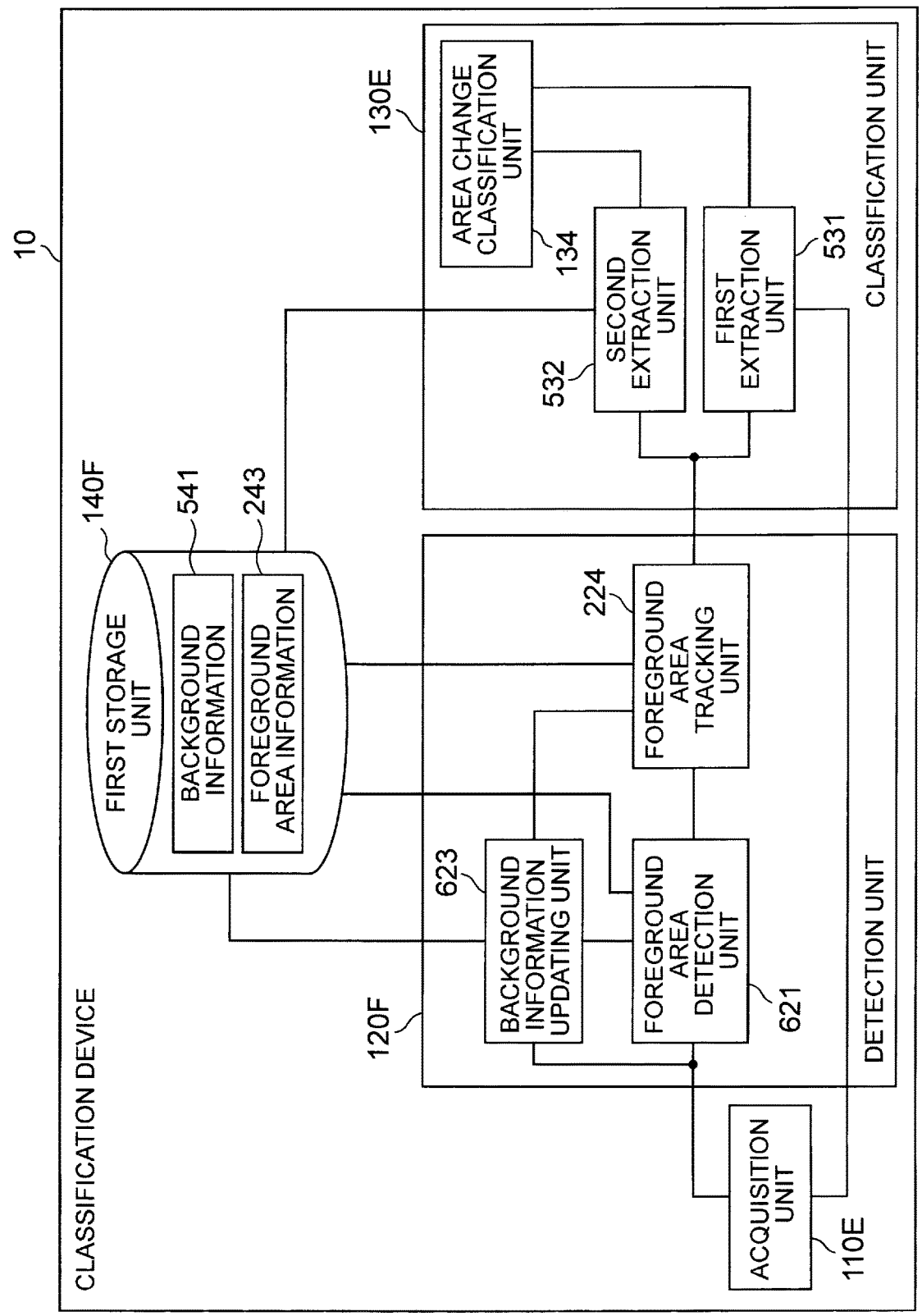
FIG. 22 It depicts a block diagram illustrating another example of the classification device 10 included in the image processing device 100.

FIG. 22 is a block diagram illustrating another example of the classification device 10 included in the image processing device 100 of the present exemplary embodiment. The image processing device 100 including the classification device 10 in this example tracks the area of change detected by the foreground area detection unit 621 among a plurality of range images. The elements having the same functions as the elements included in the above-described drawings are designated by the same reference numerals, and the description thereof will be omitted.

The classification device 10 includes an acquisition unit 110E, a detection unit 120F, a classification unit 130E, and a first storage unit 140F.

The first storage unit 140F stores background information 541 similarly to the first storage unit 140E. Furthermore, the first storage unit 140F stores foreground area information 243.

The detection unit 120F has a foreground area detection unit 621, a background information updating unit 623, and a foreground area tracking unit 224.

The foreground area detection unit 621 detects the area of change by the same operation as the operation of the foreground area detection unit 521. Then, the foreground area detection unit 621 generates, for example, a binary image in which the pixel value of the detected area of change is represented by 255 and the pixel value of other areas is represented by 0, as the detection result, similarly to the foreground area detection unit 521. Furthermore, the foreground area detection unit 621 associates the binary image, which is the detection result, with the imaging time of the captured image used to generate the binary image. The foreground area detection unit 621 supplies the detection result associated with the imaging time of the captured image to the background information updating unit 623 and to the foreground area tracking unit 224. Moreover, the foreground area detection unit 621 stores this detection result, as the foreground area information 243, into the first storage unit 140F.

The background information updating unit 623 updates the background information 541 by the same operation as the operation of the background information updating unit 523, on the basis of the captured image supplied from the acquisition unit 110E, the detection result supplied from the foreground area detection unit 621, the background information 541, and the update signal supplied from the foreground area tracking unit 224. Similarly to the background information updating unit 223, the background information updating unit 623 may or may not update the image of the part corresponding to the area of change.

Moreover, the foreground area tracking unit 224 uses the binary image generated from the range image to track the area of change, similarly to the foreground area tracking unit 224 in the second example.

Figure 23:
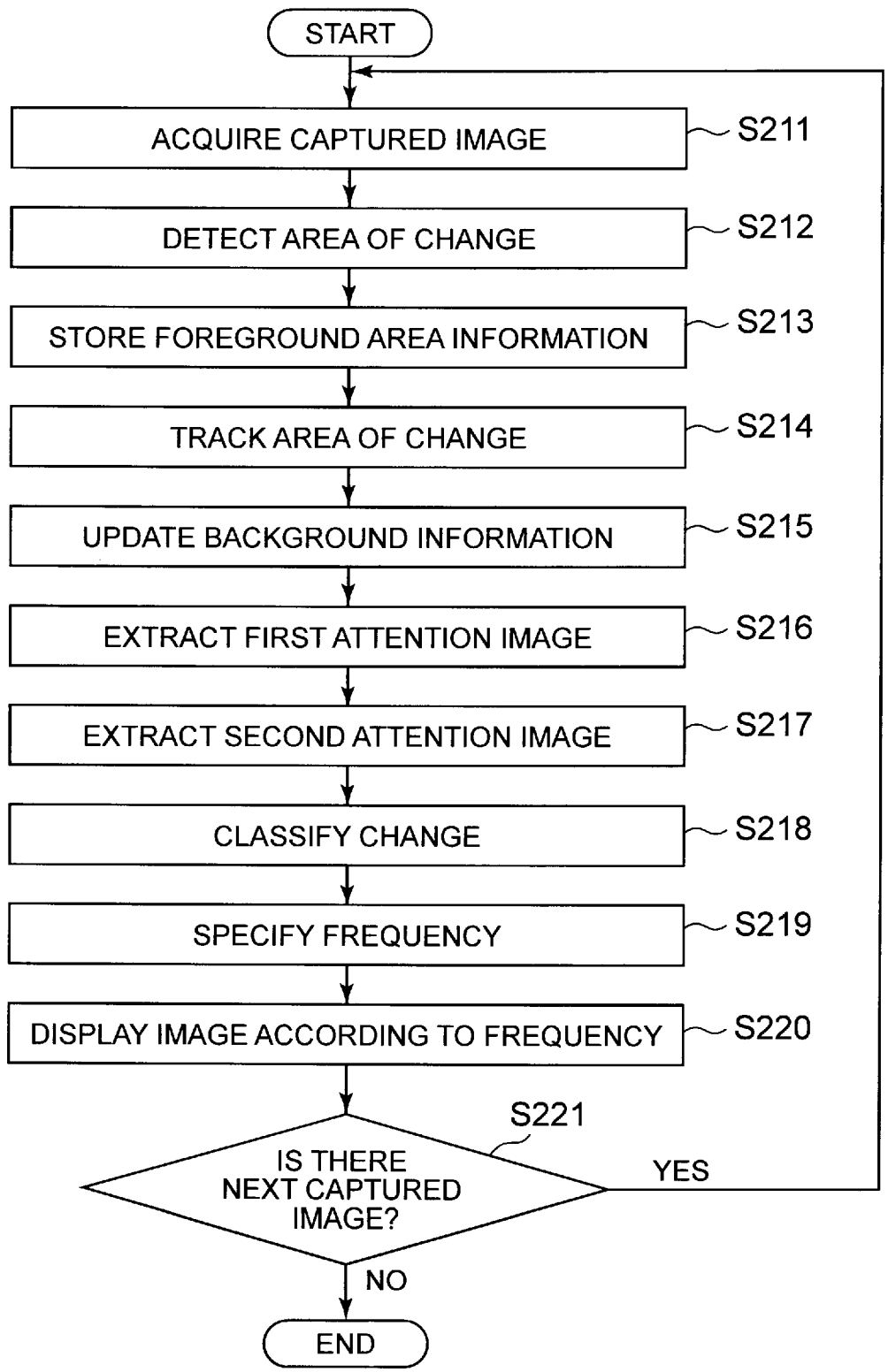
FIG. 23 It depicts a flowchart illustrating an example of operation of the image processing device 100 including the classification device 10 in a sixth example.

Referring to FIG. 23, the following describes the operation of the image processing device 100 including the classification device 10 in the sixth example. FIG. 23 is a flowchart illustrating an example of operation of the image processing device 100 including the classification device 10 in the sixth example. Steps S211 to S212 illustrated in FIG. 23 are the same as steps S191 to S192 illustrated in FIG. 21, respectively.

After the end of step S212, the foreground area detection unit 621 stores the foreground area information 243 in the first storage unit 140F (step S213). As described above, the foreground area information 243 is a detection result associated with the imaging time.

Subsequently, the foreground area tracking unit 224 tracks the area of change on the basis of the detection result supplied from the foreground area detection unit 621 and of the foreground area information 243 (step S214). The foreground area tracking unit 224 supplies the binary image representing the area of change tracked for a predetermined time or longer to the classification unit 130E. The foreground area tracking unit 224 supplies the update signal indicating the update of the background information 541 to the background information updating unit 623.

The background information updating unit 623 updates the background information 541 on the basis of the captured image supplied from the acquisition unit 110E, the detection result of the area of change supplied from the foreground area detection unit 621, the background information 541, and the update signal supplied from the foreground area tracking unit 224 (step S215).

Note that step S215 may be performed at any timing after step S214.

Then, the image processing device 100 including the classification device 10 in this example executes steps S216 to S221, which are the same processes as steps S194 to S199 illustrated in FIG. 21.

As described above, the classification device 10 in this example includes the classification device 10 in the fifth example and further the foreground area tracking unit 224 in the second example. Even with this configuration, the present invention is able to accurately classify the area in which a change actually occurs.

(Modification of Foreground Area Detection Unit)

The foreground area detection unit (more specifically, the foreground area detection unit 121, the foreground area detection unit 221, the foreground area detection unit 521, or the foreground area detection unit 621) included in the classification device 10 of each example described above may specify that the physical object included in the area of change is other than a product in the product shelf 4 by using the previously-registered shelf area information.

In the present modification, description will be made on a modification of the foreground area detection unit 121 of the classification device 10 in the first example. Note that, however, the contents of this modification are also applicable to the foreground area detection units in the second to sixth examples.

Figure 24:
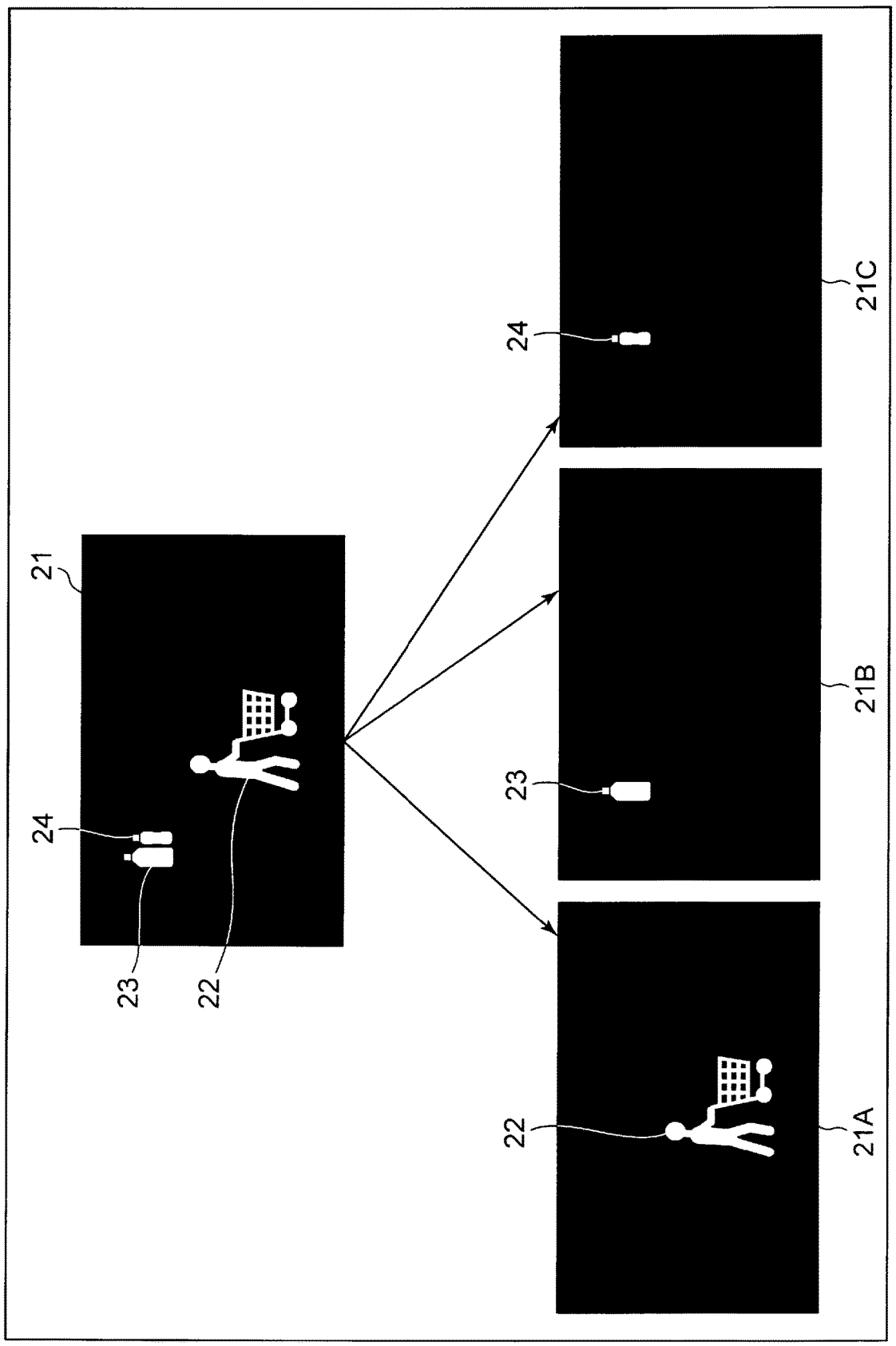
FIG. 24 It depicts an explanatory diagram illustrating an example of operation of a foreground area detection unit 121.
Figure 25:
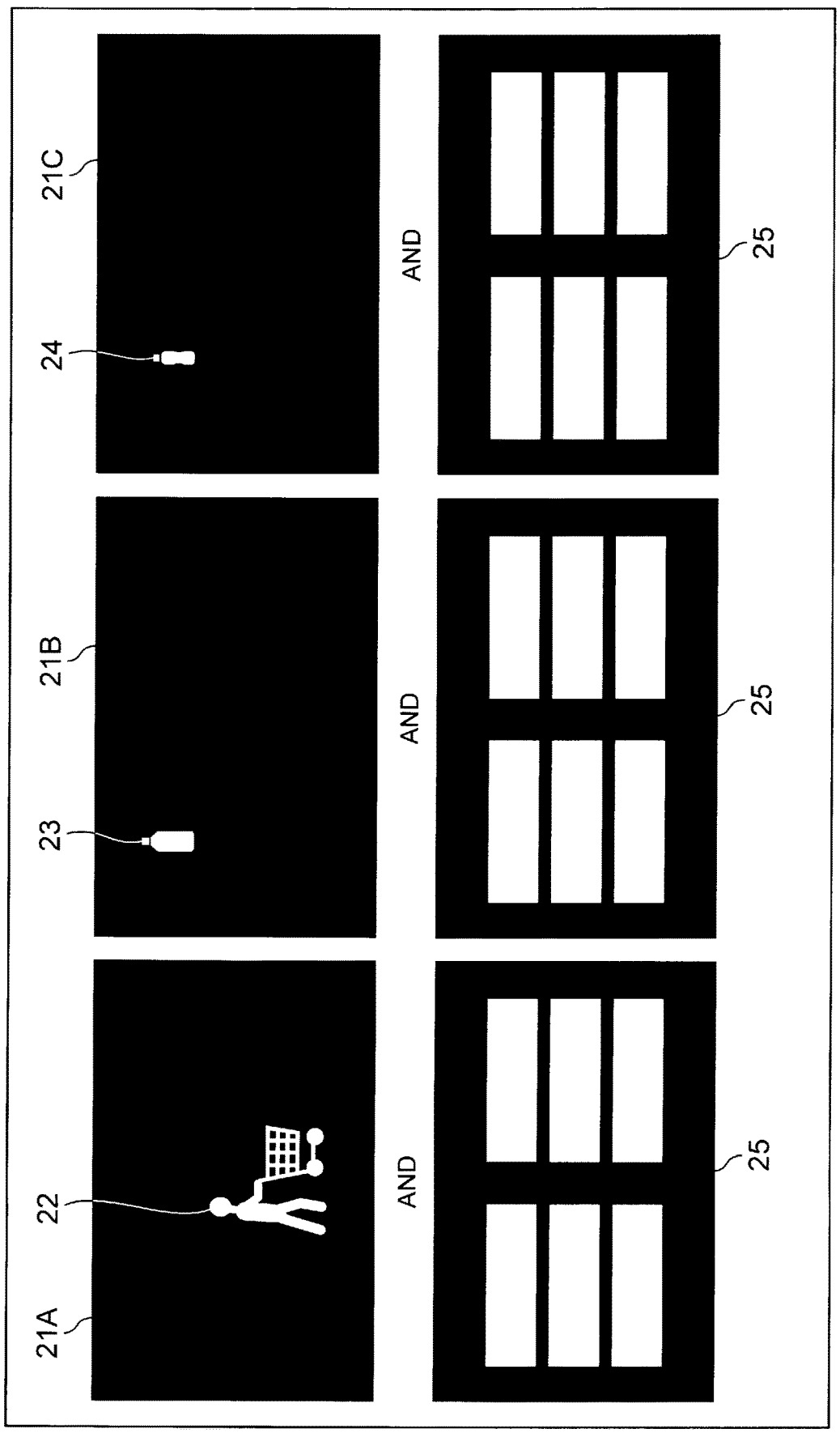
FIG. 25 It depicts an explanatory diagram illustrating an example of operation of the foreground area detection unit 121.
Figure 26:
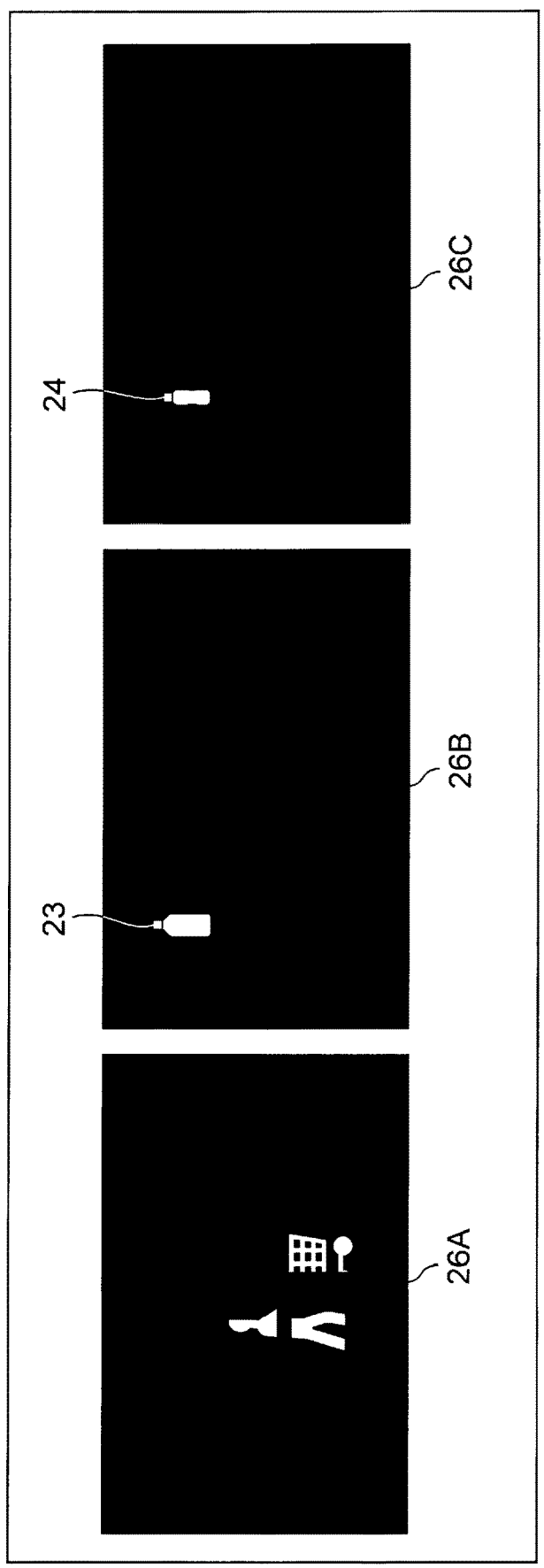
FIG. 26 It depicts an explanatory diagram illustrating an example of operation of the foreground area detection unit 121.

FIGS. 24, 25, and 26 are explanatory diagrams each illustrating an example of operation of the foreground area detection unit 121 in the present modification.

It is assumed that the foreground area detection unit 121 detects the area of change by comparing the captured image supplied from the acquisition unit 110A with the background information 141 and thereby has generated, for example, a detection result 21, which is a binary image representing the area of change illustrated in FIG. 24. It is then assumed that this detection result includes three areas of change, an area of change 22, an area of change 23, and an area of change 24. For the detection result 21, the foreground area detection unit 121 generates a detection result 21A, a detection result 21B, and a detection result 21C, which are binary images separated for each area of change, by a general labeling method.

In other words, the foreground area detection unit 121 generates a plurality of binary images such that each area of change is included in a separate binary image in the case where the detection result includes a plurality of areas of changes.

Then, the foreground area detection unit 121 determines whether or not the area of change is the area in which a change related to the change of a product is detected, on the basis of the previously-registered shelf area information and of each of the plurality of binary images.

The shelf area information indicates the area where the products on the product shelf 4 are displayed. Since the product analysis system 1 monitors the products on the product shelf 4, the area where the products are displayed, which is indicated by the shelf area information, is also referred to as "monitored area" and the shelf area information is also referred to as "monitored area information." The shelf area information is, for example, an image having the same size as the captured image acquired by the acquisition unit 110A and may be a binary image with the pixel value of 255 for the monitored area of the product shelf 4 to be monitored and with the pixel value of 0 for others. Moreover, the number of monitored areas included in the shelf area information may be, for example, one or more. The shelf area information may be stored, for example, in the first storage unit 140A in advance. The shelf area information includes information that specifies the product shelf 4 included in the captured image acquired by the first acquisition unit 110A.

The foreground area detection unit 121 uses, for example, the shelf area information 25 illustrated in FIG. 25, which is related to the product shelf 4 included in the captured image acquired by the acquisition unit 110A to perform an AND operation, for each corresponding pixel, with the detection result 21A, the detection result 21B, or the detection result 21C. As illustrated in FIG. 25, the monitored area is expressed in white in the shelf area information 25, and therefore the shelf area information 25 includes six monitored areas.

A calculation result 26A illustrated in FIG. 26 is a result of the AND operation between the shelf area information 25 and the detection result 21A. Moreover, a calculation result 26B is a result of the AND operation between the shelf area information 25 and the detection result 21B. Furthermore, a calculation result 26C is a result of the AND operation between the shelf area information 25 and the detection result 21C.

Objects other than products such as persons or carts span the areas of a plurality of shelves. Therefore, as a result of the AND operation between the detection result 21A and the shelf area information 25, the part with the pixel value of 255 (white part) that represents an area of change is divided into a plurality of areas, as in the calculation result 26A illustrated on the left side of FIG. 26. On the other hand, the parts (white parts) that represent the areas of change in the calculation result 26B and the calculation result 26C do not change as illustrated in the detection result 21B and the detection result 21C, respectively, and each of the parts corresponds to a continuous area (a set of pixels with a pixel value of 255 and with any of the pixels adjacent to those pixels having a pixel value of 255). The products displayed in the display area (monitored area) of the product shelf 4 do not span the plurality of monitored areas. Therefore, if the area of change is divided into a plurality of areas as in the calculation result 26A, the foreground area detection unit 121 determines that the change in this area of change is a change of an object other than a product. In such a case, the foreground area detection unit 121 does not add this change to the detection result, which is to be supplied to the classification unit 130A. In other words, the foreground area detection unit 121 supplies the detection result 21B and the detection result 21C to the classification unit 130A.

Thus, the classification unit 130A is able to perform the classification process of changes in the products displayed on the product shelf 4, thereby preventing a reduction in the accuracy of classifying the changes in the products. Moreover, the foreground area detection unit 121 is able to classify the change in the area of change as a change in an object other than a product before the classification unit 130A performs the classification process, thereby enabling a reduction in the amount of throughput of the classification unit 130A.

In each exemplary embodiment described above, the captured image captured by the imaging device 2 may be, for example, a captured image of products stacked on a wagon. The image processing device is able to detect the area of change by comparing the captured image of the products stacked on the wagon with the background image. Therefore, the image processing device 100 in each exemplary embodiment is able to use the captured image of products displayed in various display methods, without limiting the captured image to an image of the product shelf so that all faces of the products can be seen.

Figure 27:
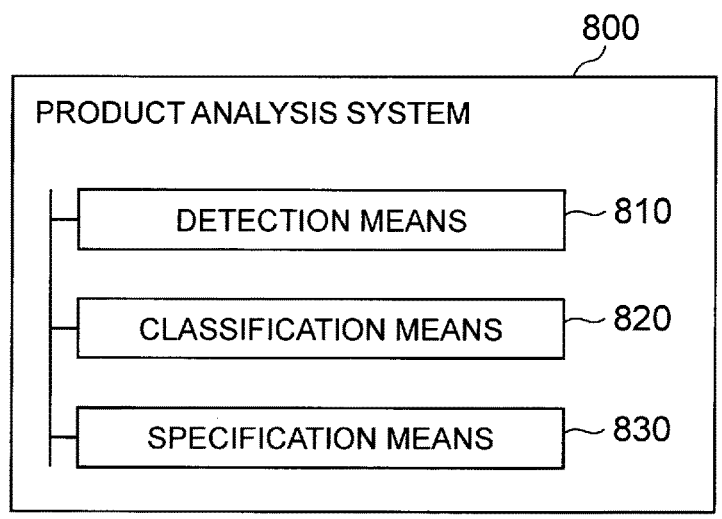
FIG. 27 It depicts a block diagram illustrating an outline of the product analysis system according to the present invention.

Subsequently, the outline of the present invention will be described. FIG. 27 is a block diagram illustrating an outline of the product analysis system according to the present invention. The product analysis system 800 (for example, the product analysis system 1) includes a detection means 810 (for example, the detection unit 120) for detecting the area of change in the product shelf from a video of the product shelf, a classification means 820 (for example, the classification unit 130) for classifying a change in the product shelf in the detected area of change, and a specification means 830 (for example, the specification unit 150) for specifying the frequency at which a customer was interested in but did not purchase the product on the basis of the classification of the change.

With the above configuration, the present invention is able to analyze products that customers are interested in even for products that the customers did not purchase.

Moreover, the product analysis system 800 may include a display means for displaying the video of a product shelf (for example, the output control unit 160 and the output device 3). Further, the display means may superimpose and display the image of the mode according to the frequency at which the customer was interested in but did not purchase the product on the video of the product shelf.

Specifically, the display means may superimpose and display the image of the mode according to the frequency at which the customer was interested in but did not purchase the product on the area of change for the video of the product shelf.

Moreover, the classification means 820 may classify a change in the product shelf as any one of a change caused by taking a product from the product shelf, a change caused by placing a product on the product shelf, and a change caused by shifting the position of a product that has been placed on the product shelf. Then, the specification means 830 may specify the frequency at which a customer was interested in but did not purchase a product for the product in which either one of the following changes has occurred: a change caused by placing a product on the product shelf; and a change caused by shifting the position of a product that has been placed on the product shelf.

In addition, the specification means 830 may specify the product that the customer was interested in but did not purchase, on the basis of the classification of the change in the product shelf and of the shelving information (for example, the shelving information 171) of the product shelf.

Further, the specification means 830 may specify the frequency of the specified product for each product category or for each area in which the product is displayed.

Furthermore, the specification means 830 may specify the frequency at which the customer purchased the product for a product where a change is caused by taking the product from the product shelf. In addition, the display means may display images in the modes in which the frequency at which the customer purchased the product is distinguishable from the frequency at which the customer was interested in but did not purchase the product so as to be superimposed on the areas of change, respectively.

In addition, the display means may display an image of a color according to the frequency at which the customer was interested in but did not purchase the product so as to be superimposed on the area of change for the video of the product shelf.

(About Hardware Configuration)

Figure 28:
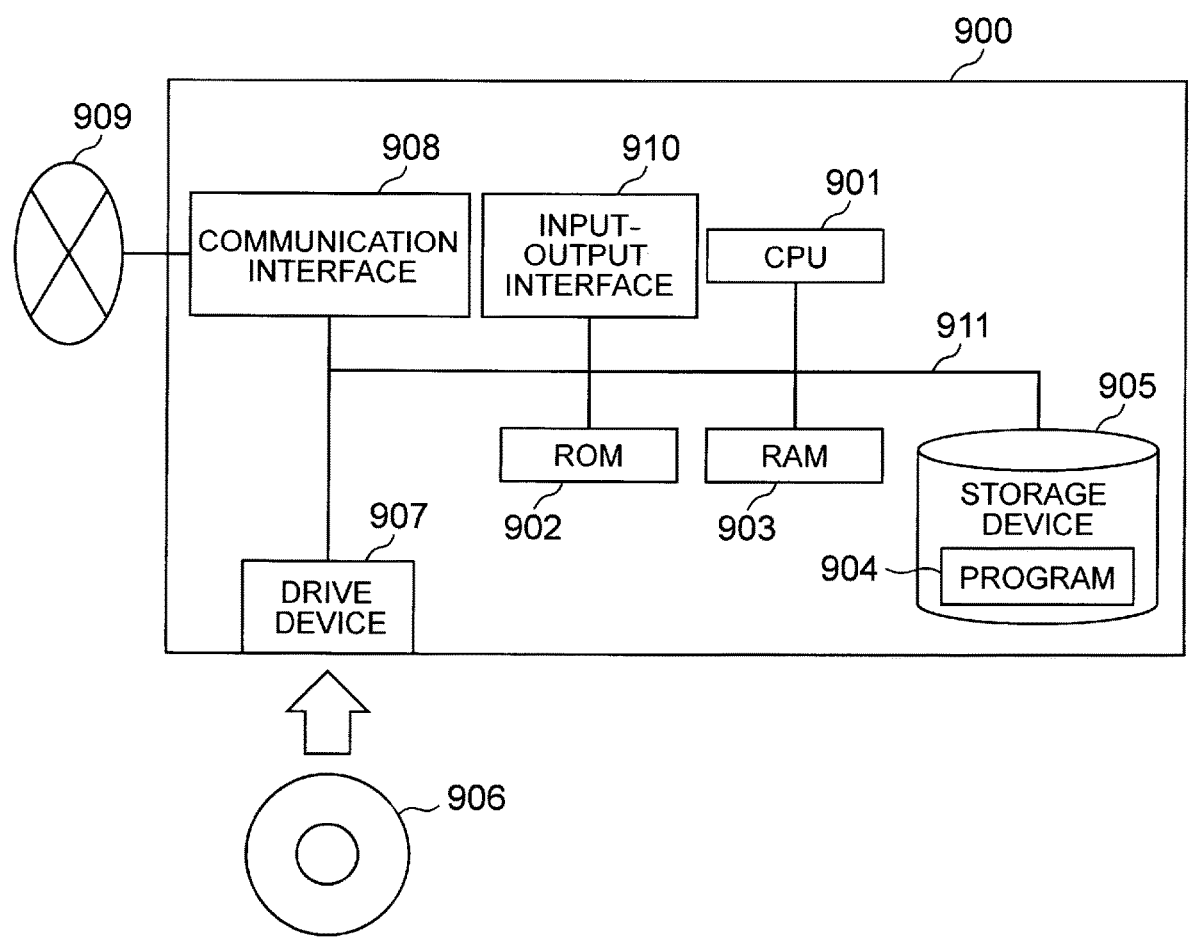
FIG. 28 It depicts a block diagram illustrating a hardware configuration example of an information processing device for implementing constituent elements of each device.

In each exemplary embodiment of the present disclosure, each constituent element of each device represents a block of a functional unit. Some or all of the constituent elements of each device are implemented by, for example, an arbitrary combination of the information processing device 900 and a program illustrated in FIG. 28. FIG. 28 illustrates a block diagram representing a hardware configuration example of the information processing device 900 that implements the constituent elements of each device. The information processing device 900 includes, for example, the following components.

Central processing unit (CPU) 901
Read only memory (ROM) 902
Random access memory (RAM) 903
Program 904 loaded in RAM 903
Storage device 905 that stores program 904
Drive device 907 that reads and writes data on recording medium 906
Communication interface 908 connected to communication network 909
Input-output interface 910 that inputs and outputs data
Bus 911 that connects components The constituent elements of each device in each of the exemplary embodiments are implemented by the CPU 901 acquiring and executing the program 904 that implements these functions. The program 904 that implements the functions of the constituent elements of each device is, for example, stored in advance in the storage device 905 or the ROM 902. The CPU 901 loads the program 904 in the RAM 903 to execute the program 904, as necessary. The program 904 may be supplied to the CPU 901 via the communication network 909 or, alternatively, may be stored in the recoding medium 906 in advance so that the drive device 907 may read the program and supply it to the CPU 901.

There are various modifications for the methods of implementing each device. Each device may be implemented by an arbitrary combination of the information processing device 900 and a program, which are separate for each constituent element. Moreover, a plurality of constituent elements included in each device may be implemented by an arbitrary combination of one information processing device 900 and a program.

Further, some or all of the constituent elements of each device can be implemented by other general-purpose or dedicated circuits, processors, or the like or a combination thereof. These may be configured by a single chip, or may be configured by a plurality of chips connected via a bus.

Some or all of the constituent elements of each device may be implemented by a combination of the above-described circuits or the like and a program.

In the case where some or all of the constituent elements of each device are implemented by a plurality of information processing devices, circuits, or the like, the plurality of information processing devices, circuits, or the like may be centrally arranged or may be distributed. For example, the information processing devices, circuits, or the like may be implemented in a form such as a client and server system, a cloud computing system, or the like, in which the information processing devices, circuits, or the like are connected to each other via a communication network.

Each exemplary embodiment described above is merely a preferred embodiment of the present disclosure, and the scope of the present disclosure is not limited only to the above-described exemplary embodiments. It is obvious that a person skilled in the art can modify or substitute the exemplary embodiments without departing from the gist of the present disclosure to construct forms with various changes.

REFERENCE SIGNS LIST

1 Product analysis system
2 Imaging device
3 Output device
4 Product shelf
10 Classification device
100 Image processing device
110 Acquisition unit
120 Detection unit
121 Foreground area detection unit
123 Background information updating unit
130 Classification unit
131 First extraction unit
132 Second extraction unit
134 Area change classification unit
140 First storage unit
141 Background information
142 Shelf change model
150 Specification unit
160 Output control unit
170 Second storage unit
171 Shelving information
221 Foreground area detection unit
223 Background information updating unit
224 Foreground area tracking unit
243 Foreground area information
311 First acquisition unit
312 Second acquisition unit
331 First extraction unit
332 Second extraction unit
334 Area change classification unit
335 Distance information updating unit
344 Distance information
435 Distance information updating unit
521 Foreground area detection unit
523 Background information updating unit
531 First extraction unit
532 Second extraction unit
541 Background information

The invention claimed is:

1. A product analysis system comprising a hardware processor configured to execute a software code to:
   detect an area of change in a product shelf from a video of the product shelf;
   classify the change in the product shelf in the detected area of change;
   specify a frequency at which a customer was interested in but did not purchase a product on the basis of the classification of the change; and
   display an image representing a value of the frequency itself or a heat map expressed according to the frequency, as an image of a mode according to the frequency at which the customer was interested in but did not purchase the product, so as to be superimposed on the area of change for the video of the product shelf.

2. The product analysis system according to claim 1, wherein the hardware processor is configured to execute the software code to:
classify the change in the product shelf as any one of a change caused by taking a product from the product shelf, a change caused by placing a product on the product shelf, and a change caused by shifting the position of a product that has been placed on the product shelf; and
specify the frequency at which the customer was interested in but did not purchase the product for the product in which there is occurred the change caused by placing a product on the product shelf or the change caused by shifting the position of a product that has been placed on the product shelf.

3. The product analysis system according to claim 1, wherein the hardware processor is configured to execute the software code to specify a product that the customer was interested in but did not purchase on the basis of the classification of a change in the product shelf and of shelving information of the product shelf.

4. The product analysis system according to claim 3, wherein the hardware processor is configured to execute the software code to specify the frequency of the specified product for each category of the product or for each area in which the product is displayed.

5. The product analysis system according to claim 1, wherein the hardware processor is configured to execute the software code to:
specify a frequency at which the customer purchased a product for the product in which there is occurred a change caused by taking the product from the product shelf; and
display images in the mode in which the frequency at which the customer purchased the product is distinguishable from the frequency at which the customer was interested in but did not purchase the product so as to be superimposed on the areas of change, respectively.

6. The product analysis system according to claim 1, wherein the hardware processor is configured to execute the software code to display an image of a color according to the frequency at which the customer was interested in but did not purchase the product so as to be superimposed on the area of change for the video of the product shelf.

7. A product analysis method comprising:
detecting an area of change in a product shelf from a video of the product shelf; classifying the change in the product shelf in the detected area of change; and
specifying a frequency at which a customer was interested in but did not purchase a product on the basis of the classification of the change; and
displaying an image representing a value of the frequency itself or a heat map expressed according to the frequency, as an image of a mode according to the frequency at which the customer was interested in but did not purchase the product, so as to be superimposed on the area of change for the video of the product shelf.

8. A non-transitory computer readable information recording medium storing a product analysis program, when executed by a processor, that performs a method for:
detecting an area of change in a product shelf from a video of the product shelf;
classifying the change in the product shelf in the detected area of change; and
specifying a frequency at which a customer was interested in but did not purchase a product on the basis of the classification of the change; and
displaying an image representing a value of the frequency itself or a heat map expressed according to the frequency, as an image of a mode according to the frequency at which the customer was interested in but did not purchase the product, so as to be superimposed on the area of change for the video of the product shelf.

* * * * *